(12) United States Patent
Noh et al.

(10) Patent No.: US 12,423,606 B1
(45) Date of Patent: Sep. 23, 2025

(54) QUANTUM CODES IMPLEMENTED USING CAT DATA QUBITS AND TRANSMON ANCILLA QUBITS

(71) Applicant: Amazon Technologies, Inc., Seattle, WA (US)

(72) Inventors: Kyungjoo Noh, Pasadena, CA (US); Christopher Chamberland, Pasadena, CA (US); Harald Esko Jakob Putterman, Malibu, CA (US); Oskar Jon Painter, Sierra Madre, CA (US); Fernando Brandao, Pasadena, CA (US); Andrew Joseph Keller, San Francisco, CA (US); Patricio Arrangoiz Arriola, San Francisco, CA (US); Thomas Scaffidi, Kensington, CA (US); Menyoung Lee, Ithaca, NY (US); Matthew Matheny, Diamond Bar, CA (US); Colm Andrew Ryan, Arcadia, CA (US); Prasahnt Sivarajah, Pasadena, CA (US); Connor Hann, New Haven, CT (US); Arne Grimsmo, Pasadena, CA (US); Joseph Kramer Iverson, Pasadena, CA (US); Ashley James Milsted, Pasadena, CA (US)

(73) Assignee: Amazon Technologies, Inc., Seattle, WA (US)

(*) Notice: Subject to any disclaimer, the term of this patent is extended or adjusted under 35 U.S.C. 154(b) by 790 days.

(21) Appl. No.: 17/548,402

(22) Filed: Dec. 10, 2021

(51) Int. Cl.
*G06N 10/20* (2022.01)
*G06N 10/40* (2022.01)
*G06N 10/60* (2022.01)

(52) U.S. Cl.
CPC ............. *G06N 10/20* (2022.01); *G06N 10/40* (2022.01); *G06N 10/60* (2022.01)

(58) Field of Classification Search
CPC ......... G06N 10/20; G06N 10/40; G06N 10/60
See application file for complete search history.

(56) References Cited

U.S. PATENT DOCUMENTS

2022/0147856 A1* 5/2022 Kliuchnikov ........... G06F 15/82
2022/0414514 A1* 12/2022 Korotkov ............... G06N 10/70
(Continued)

OTHER PUBLICATIONS

Mazyar Mirrahimi. Cat-qubits for quantum computation. Comptes Rendus. Physique, vol. 17 (2016) No. 7, pp. 778-787. doi : 10.1016/j.crhy.2016.07.011. https://comptes-rendus.academie-sciences.fr/physique/articles/10.1016/j.crhy.2016.07.011/ (Year: 2016).*
(Continued)

*Primary Examiner* — Jack Chiang
*Assistant Examiner* — Aric Lin
(74) *Attorney, Agent, or Firm* — Alexander A. Knapp; Kowert, Hood, Munyon, Rankin & Goetzel, P.C.

(57) ABSTRACT

Systems and methods for implementing a quantum code using cat qubits as data qubits and transmon qubits as ancilla qubits is disclosed. In some embodiments, a three-level transmon is used and Chi-matching is performed to determine dispersive coupling coefficients between the cat qubits and first and second excited states of the transmon qubits, wherein the dispersive coupling coefficients are used to perform gates between the cat data qubits and the transmon ancilla qubits. The Chi-matching determines the dispersive coupling coefficients such that the cat qubits are rotated in a same manner while performing the gates regardless as to whether a given transmon ancilla qubit remains in a second excited state or has decayed to a first excited state.

20 Claims, 21 Drawing Sheets

(56) References Cited

U.S. PATENT DOCUMENTS

2023/0071000 A1* 3/2023 Higgott ............. H03M 13/1575
2024/0303524 A1* 9/2024 Houck ................. G06N 10/40

OTHER PUBLICATIONS

Joachim Cohen, "Autonomous quantum error correction with superconducting qubits," HAL open science, Physics [physics]. Universite Paris sciences et lettres, 2017. English. ffNNT : 2017PSLEE008ff. fftel-01545186, Jun. 2017, pp. 1-164.

S. Rosenblum, et al., Fault-tolerant detection of a quantum error, Science vol. 361 Issue 6399, Jul. 2018, arXiv:1803.00102 [quant-ph], pp. 1-35.

Raphael Lescanne, et al., "Exponential suppression of bit-flips in a qubit encoded in an oscillator," Nature Physics vol. 16, (2020), arXiv preprint: arXiv:1907.11729v1 [quant-ph], pp. 1-18.

Chen Wang, et al. "A Schrodinger cat living in two boxes," Science, May 2016, vol. 352, Issue 6289, pp. 1087-1091, DOI: 10.1126/science.aaf2941.

Philip Reinhold, et al., "Error-corrected gates on an encoded qubit," Nature Physics vol. 16, pp. 822-826 (2020), downloaded from arXiv preprint: arXiv:1907.12327 [quant-ph], pp. 1-15.

S. Touzard, et al., "Gated Conditional Displacement Readout of Superconducting Qubits," Physical Review Letters 122, arXiv preprint downloaded from arXiv:1809.06964 [quant-ph] in Sep. 2018, pp. 1-17.

P. Campagne-Ibarcq, et al., "Quantum error correction of a qubit encoded in grid states of an oscillator," Nature vol. 584, pp. 368-372 (2020); downloaded from arXiv preprit arXiv:1907.12487 [quant-ph], pp. 1-26.

S. Touzard, et al., "Coherent Oscillations inside a Quantum Manifold Stabilized by Dissipation," Phys. Rev. X 8, 021005—Published Apr. 4, 2018 by the American Physical Society, pp. 1-7.

Grimm, A., Frattini, N. E., Puri, S., Mundhada, S. O., Touzard, S., Mirrahimi, M., Girvin, S. M., Shankar, S., & Devoret, M. H. (2020). "Stabilization and operation of a Kerr-cat qubit". Nature, 584(7820), 205-209. https://doi.org/10.1038/s41586-020-2587-z, arXiv preprint: arXiv:1907.12131v2 [quant-ph], pp. 1-24.

* cited by examiner

Time Step 1:
Transmon state preparation

Time Step 2:
Application of C-XX gates, cat stabilization turned off

Time Step 3:
Application of Hadamard gates to ground and second excited state of transmons to allow for transmon rotation Time Step 4:
Read-out of transmons in the
g, e, and f basis $|g\rangle$ vs. $|e\rangle$ vs. $|f\rangle$ or $|g\rangle$ vs. $not - |g\rangle$ Time Step 5:
Re-set of the transmons
to the ground state, cat
stabilization turned on, if
not already turned on Extract error information from the cat qubits that function as data qubits by applying a set of gates on respective sets of the cat qubits on either side of respective ones of the transmon qubits, wherein the respective ones of the transmon qubits act as control qubits for the gates with targets of the gates being the cat qubits on either side of the respective ones of the transmon qubits
304

Perform chi matching to set dispersive coupling coefficients between respective ones of the cat qubits on either side of the respective ones of the transmon qubits and the respective ones of the transmon qubits, wherein the dispersive coupling coefficients are set via the chi matching such that the respective ones of the cat qubits rotate in a same manner during the set of gates regardless as to whether a corresponding one of the transmon qubits remains in the second excited state (f) or has decayed to the first excited state (e)
702

*FIG. 7*

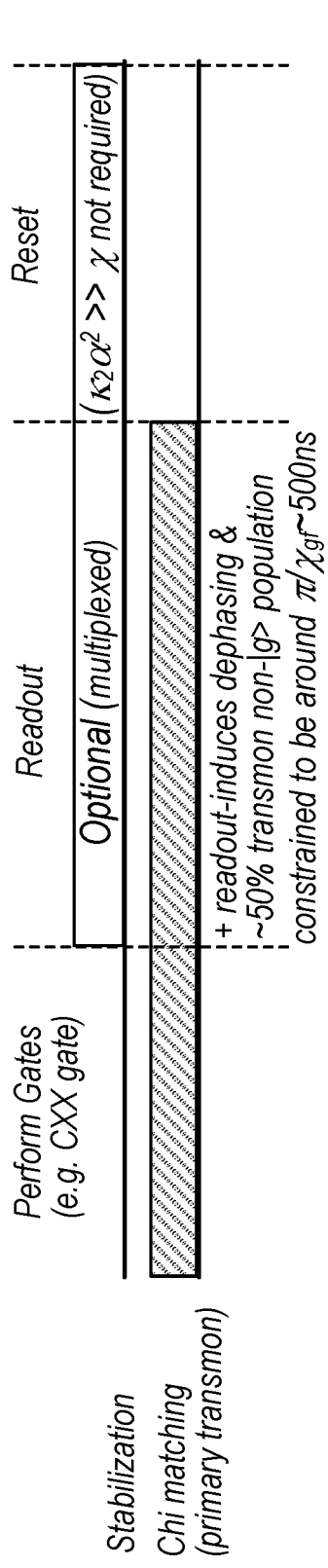
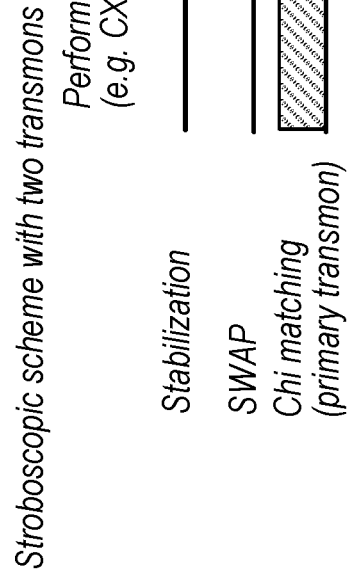
FIG. 11

*Non-destructive logical Z⊗Z measurement*
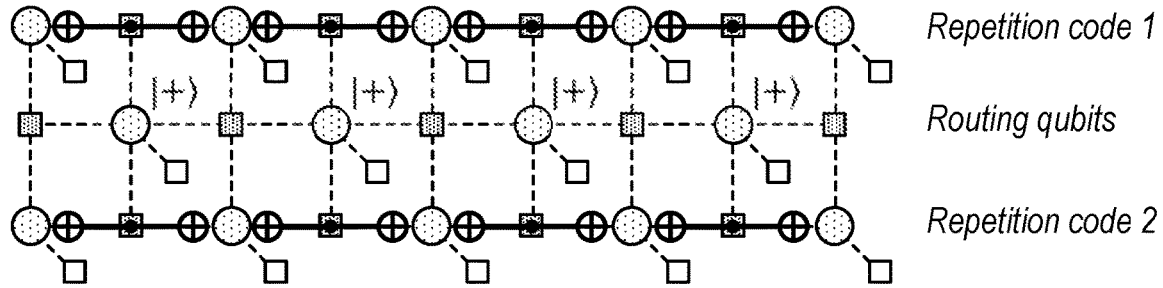
Repetition code 1
Routing qubits
Repetition code 2
↓ Merge into an XZZX surface code with $d_x=2$
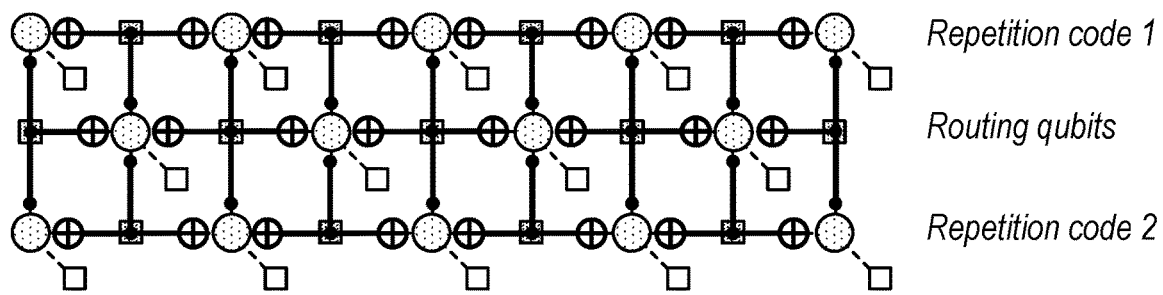
Repetition code 1
Routing qubits
Repetition code 2
↓ Split
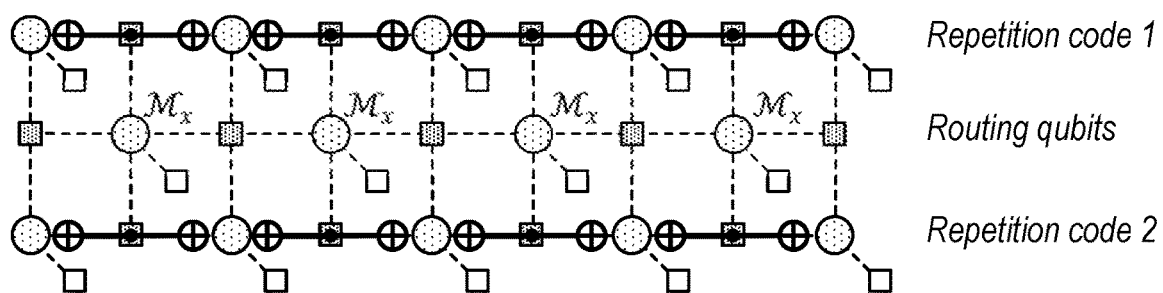
Repetition code 1
Routing qubits
Repetition code 2
FIG. 15

QUANTUM CODES IMPLEMENTED USING CAT DATA QUBITS AND TRANSMON ANCILLA QUBITS

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects like photons, molecules, atoms, and electrons.

A quantum computer is a device that utilizes quantum mechanics to allow one to write, store, process and read out information encoded in quantum states, e.g., the states of quantum objects. A quantum object is a physical object that behaves according to the laws of quantum physics. The state of a physical object is a description of the object at a given time.

In quantum mechanics, the state of a two-level quantum system, or simply, a qubit, is a list of two complex numbers, where the absolute sum of the complex numbers must sum to one. Each of the two numbers is called an amplitude, or quasi-probability. The square of an amplitude gives a potentially negative probability. Hence, each of the two numbers correspond to the square root that event zero and event one will happen, respectively. A fundamental and counterintuitive difference between a probabilistic bit (e.g., a traditional zero or one bit) and the qubit is that a probabilistic bit represents a lack of information about a two-level classical system, while a qubit contains maximal information about a two-level quantum system.

Quantum computers are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

A quantum algorithm is a reversible transformation acting on qubits in a desired and controlled way, followed by a measurement on one or multiple qubits. For example, if a system has two qubits, a transformation may modify four numbers; with three qubits this becomes eight numbers, and so on. As such, a quantum algorithm acts on a list of numbers exponentially large as dictated by the number of qubits. To implement a transform, the transform may be decomposed into small operations acting on a single qubit, or a set of qubits, as an example. Such small operations may be called quantum gates and the arrangement of the gates to implement a transformation may form a quantum circuit.

There are different types of qubits that may be used in quantum computers, each having different advantages and disadvantages. For example, some quantum computers may include qubits built from superconductors, trapped ions, semiconductors, photonics, etc. Each may experience different levels of interference, errors and decoherence. Also, some may be more useful for generating particular types of quantum circuits or quantum algorithms, while others may be more useful for generating other types of quantum circuits or quantum algorithms. Also, costs, run-times, error rates, availability, etc. may vary across quantum computing technologies.

For some types of quantum computations, such as fault tolerant computation of large-scale quantum algorithms, overhead costs for performing such quantum computations may be high. For example, for types of quantum gates that are not naturally fault tolerant, the quantum gates may be encoded in error correcting code. However, this may add to the overhead number of qubits required to implement the large-scale quantum algorithms. Also, performing successive quantum gates, measurement of quantum circuits, etc. may introduce probabilities of errors in the quantum circuits and/or measured results of the quantum circuits.

BRIEF DESCRIPTION OF THE DRAWINGS

FIG. 7 is a flowchart illustrating how chi matching may be applied to set dispersive coupling coefficients used when applying C-XX gates, according to some embodiments.

FIG. 11 illustrates control requirements of bit-flip suppression techniques, such as chi matching with one-transmon stroboscopic timing and with two-transmon stroboscopic timing, according to some embodiments.

FIG. 15 illustrates another example of lattice surgery operations performed between repetition codes, such as shown in FIG. 1, used to perform logical gates between logical information stored in the repetition codes, according to some embodiments.

Figure 1:
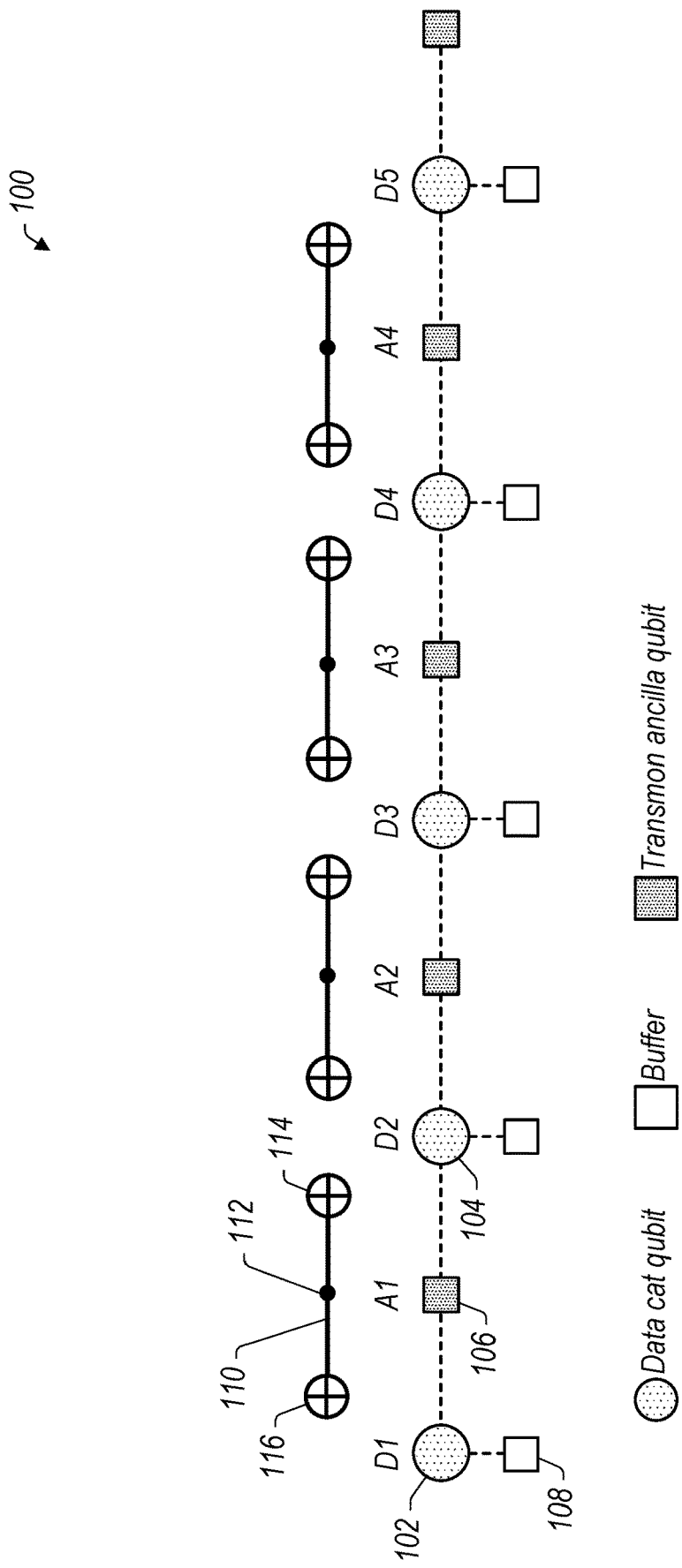
FIG. 1 illustrates a repetition code implemented using cat qubits as data qubits and transmon qubits as ancilla qubits, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for implementing quantum codes, such as repetition codes or surface codes, using cat data qubits and transmon ancilla qubits.

In some embodiments, logical information is stored in data qubits implemented using cat qubits and ancilla qubits are used to extract error information from the data qubits. The ancilla qubits are implemented using transmon qubits. The use of transmon qubits simplifies the gates performed between the data qubits and the ancilla qubits, as compared to using cat qubits for both the data qubits and the ancilla qubits. This is because transmon qubits allow for the gates to be addressed to individual energy levels of the transmon qubit. In comparison, for a cat qubit gates are mapped to the |+a) and |-a) states of the cat qubit. However, such mapping is an approximation, such that there is some measure of inexactness in the gates. In contrast, a transmon comprises a Josephson junction and capacitor in parallel, wherein the capacitor has a certain limit on its charging energy based on the Josephson junction, e.g., junction energy. The transmon behaves as a weakly non-linear oscillator. Due to this non-linearity, it is possible to address individual levels of the transmon, such as the ground state (g), first excited state (e), or second excited state (f). Thus, the gates used in a code comprising cat data qubits and transmon ancilla qubits are simpler to implement and more exact as compared to codes using cat ancilla qubits.

However, transmon qubits, when used as ancilla qubits, may decay between states, which if not addressed can cause errors. To address potential decay of transmon qubits, in some embodiments, Chi-matching is used to determine dispersive coupling coefficients between respective ones of the cat qubits and respective ones of the transmon qubits. The dispersive coupling coefficients are determined such that the respective ones of the cat qubits rotate in a same manner during the set of gates regardless as to whether a corresponding one of the transmon qubits remains in the second excited state (f) or has decayed to the first excited state (e).

Also, such an implementation of a code using cat data qubits and transmon ancilla qubits results in fewer overall qubits being used as compared to codes that use cat qubits for both the data qubits and the ancilla qubits, as further discussed below in regard to FIG. 2.

FIG. 1 illustrates a repetition code implemented using cat qubits as data qubits and transmon qubits as ancilla qubits, according to some embodiments.

For example, in some embodiments, a repetition code, such as repetition code 100, is implemented using cat data qubits 102 and transmon ancilla qubits 106. The transmon qubits are coupled between respective cat data qubits. For example, transmon ancilla qubit 106 is coupled between cat data qubit 102 and cat data qubit 104. FIG. 1 illustrates a d=5 repetition code comprising five cat data qubits (D1-D5) and four transmon ancilla qubits (A1-A4). Additionally, repetition code 100 includes buffer qubits 108 coupled to the cat data qubits. As further described herein, a C-XX gate 110 is performed to extract error information from the cat data qubits. In some embodiments, other gate types may be used in a code comprising cat data qubits and transmon ancilla qubits. In the embodiment shown in FIG. 1, the C-XX gate 110 is performed between two cat data qubits and a transmon ancilla qubit (for each set of cat data qubits) in a same time step. The C-XX gate has a control 112 at the transmon ancilla qubit, such as transmon ancilla qubit 106, and targets at respective cat data qubits on either side of the respective transmon ancilla qubit, such as targets 114 and 116 that target cat data qubits 102 and 104. Note that the C-XX gates non-destructively measure the XX stabilizers of the repetition code 100. In some embodiments, the C-XX gates may be implemented using static dispersive coupling between a transmon and two neighboring cat qubit modes. Also, it should be noted that the buffer qubits, such as buffer qubits 108, are only needed to stabilize the cat data qubits 102, 104, etc. and are not involved in performing the C-XX gates 110.

In contrast, to a repetition code implemented using cat data qubits and transmon ancilla qubits as shown in FIG. 1, a repetition code implemented using cat qubits for both the data qubits and the ancilla qubits, has a larger hardware footprint (e.g., requires more qubits) and uses gates that are not as exact, as described above in regard to approximate mapping to the |+α) and |-α) states of the cat qubit.

Figure 2:
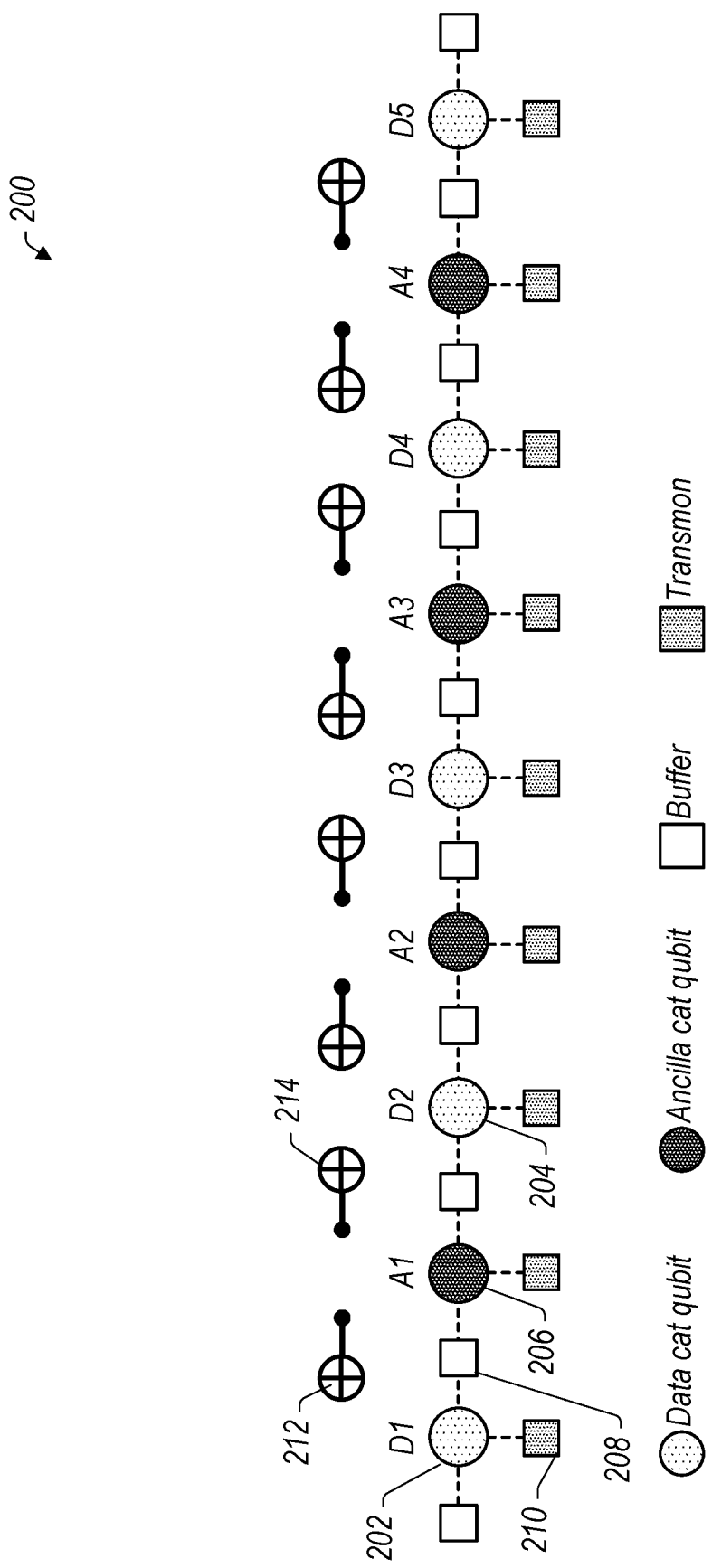
FIG. 2 illustrates a repetition code implemented using cat qubits as data qubits and cat qubits as ancilla qubits, in contrast to the repetition code shown in FIG. 1.

FIG. 2 illustrates a repetition code implemented using cat qubits as data qubits and cat qubits as ancilla qubits, in contrast to the repetition code shown in FIG. 1.

The repetition code 200 implemented using both cat data qubits and cat ancilla qubits includes cat data qubits 202, similar to repetition code 100. However, instead of a single transmon ancilla qubit 106 between the cat data qubits 202, the repetition code 200 incudes ancilla cat qubit 106 and buffer qubits 208 on either side of ancilla cat qubit 206. Additionally, repetition code 200 includes transmon qubits 210 used to readout error information from ancilla cat qubits 206. As shown in FIG. 2, in an implementation of a repetition code using both cat qubits as data qubits and ancilla qubits, CNOT gates 212 and 214 are used to extract error information from cat data qubits 202. As can be seen, the additional ancilla cat qubit 206 and buffer qubits 208 are not required when using transmon qubits to implement the ancilla qubits, as shown in FIG. 1.

Figure 3:
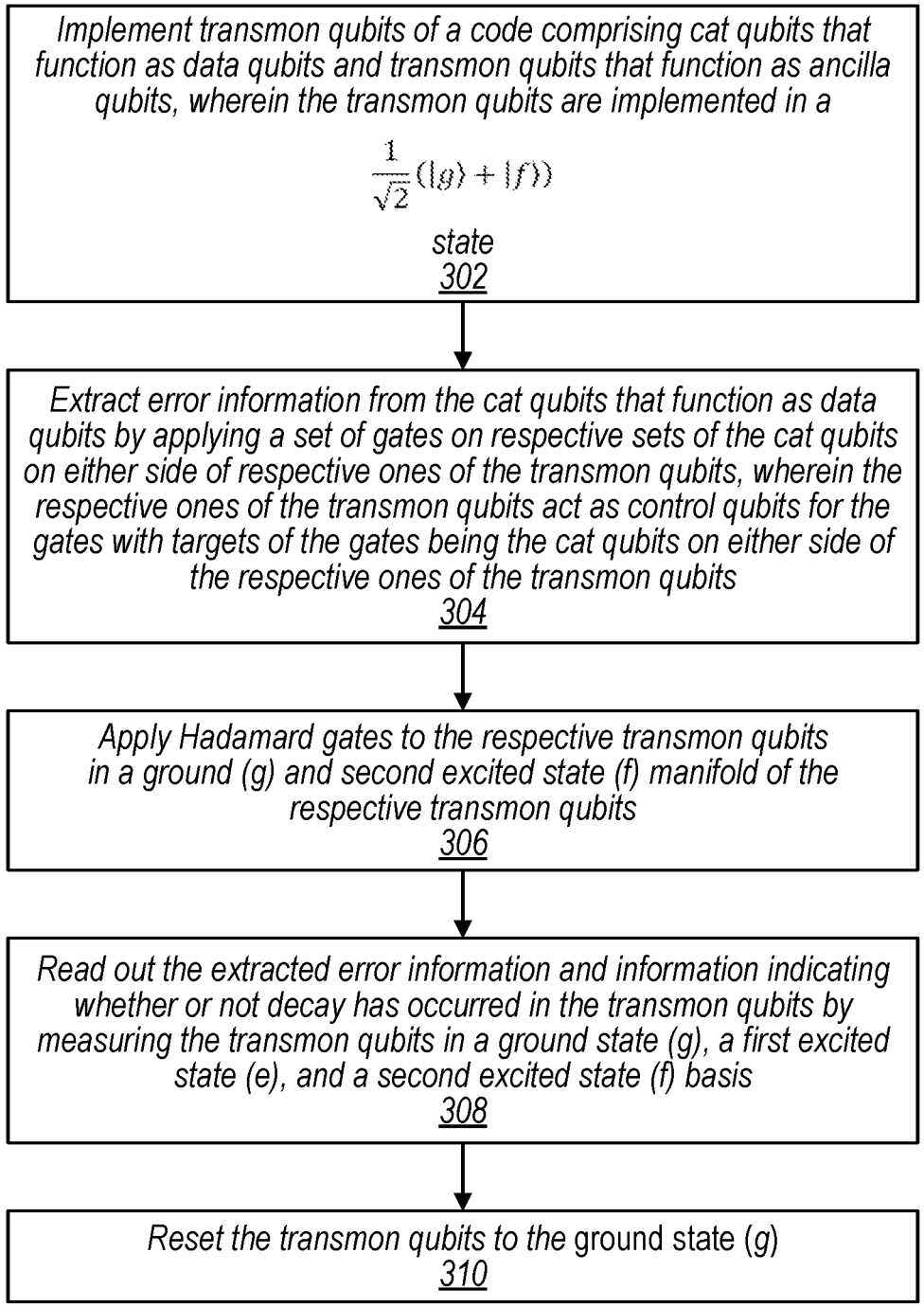
FIG. 3 is a flow chart illustrating a process for implementing a code comprising cat data qubits and transmon ancilla qubits, according to some embodiments.

FIG. 3 is a flow chart illustrating a process for implementing a code comprising cat data qubits and transmon ancilla qubits, according to some embodiments.

At block 302, transmon qubits of the repetition code are implemented on a quantum device in a $$\frac{1}{\sqrt{2}}(|g\rangle + |f\rangle)$$

state, such as on a superconducting quantum computer. At block 304, error information is extracted from the cat data qubits by applying gates, such as C-XX gates, on the respective sets of the cat qubits on either side of respective ones of the transmon qubits, wherein the respective ones of the transmon qubits act as control qubits for the gates with targets of the gates being the cat qubits on either side of the respective ones of the transmon qubits. At block 306, Hadamard gates are applied to the respective transmon qubits in a ground (g) and second excited state (f) manifold of the respective transmon qubits. Then, at block 308, extracted error information and information indicating whether or not decay has occurred is extracted by measuring the transmon qubits in a ground state (g), a first excited state (e), and a second excited state (f) basis. Finally, at block 310, the transmon qubits are reset to the ground state (g).

Figure 5:
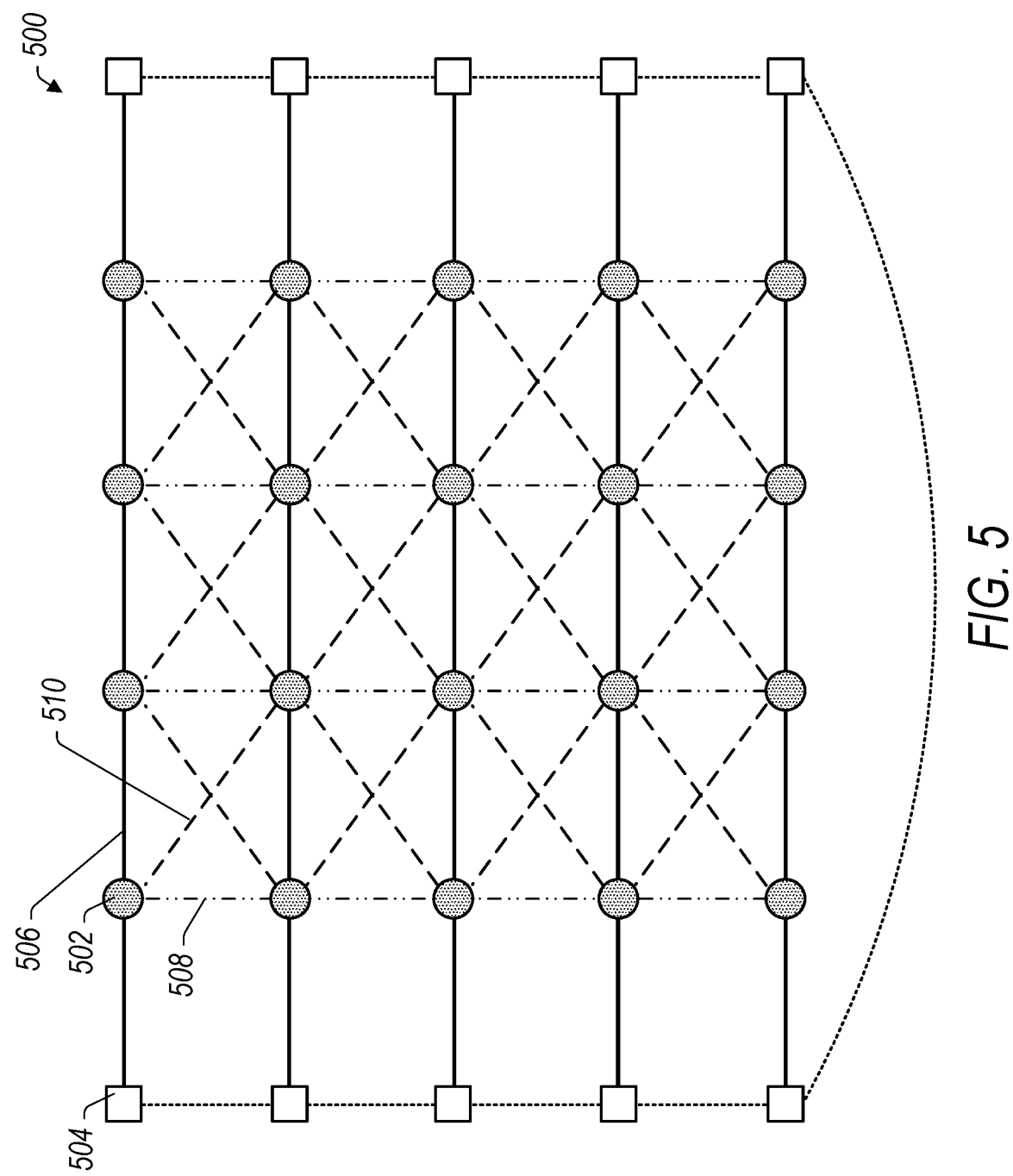
FIG. 5 illustrates an example minimum weight perfect matching (MWPM) graph for syndrome measurements of a repetition code, such as shown in FIG. 1, according to some embodiments.
Figure 6:
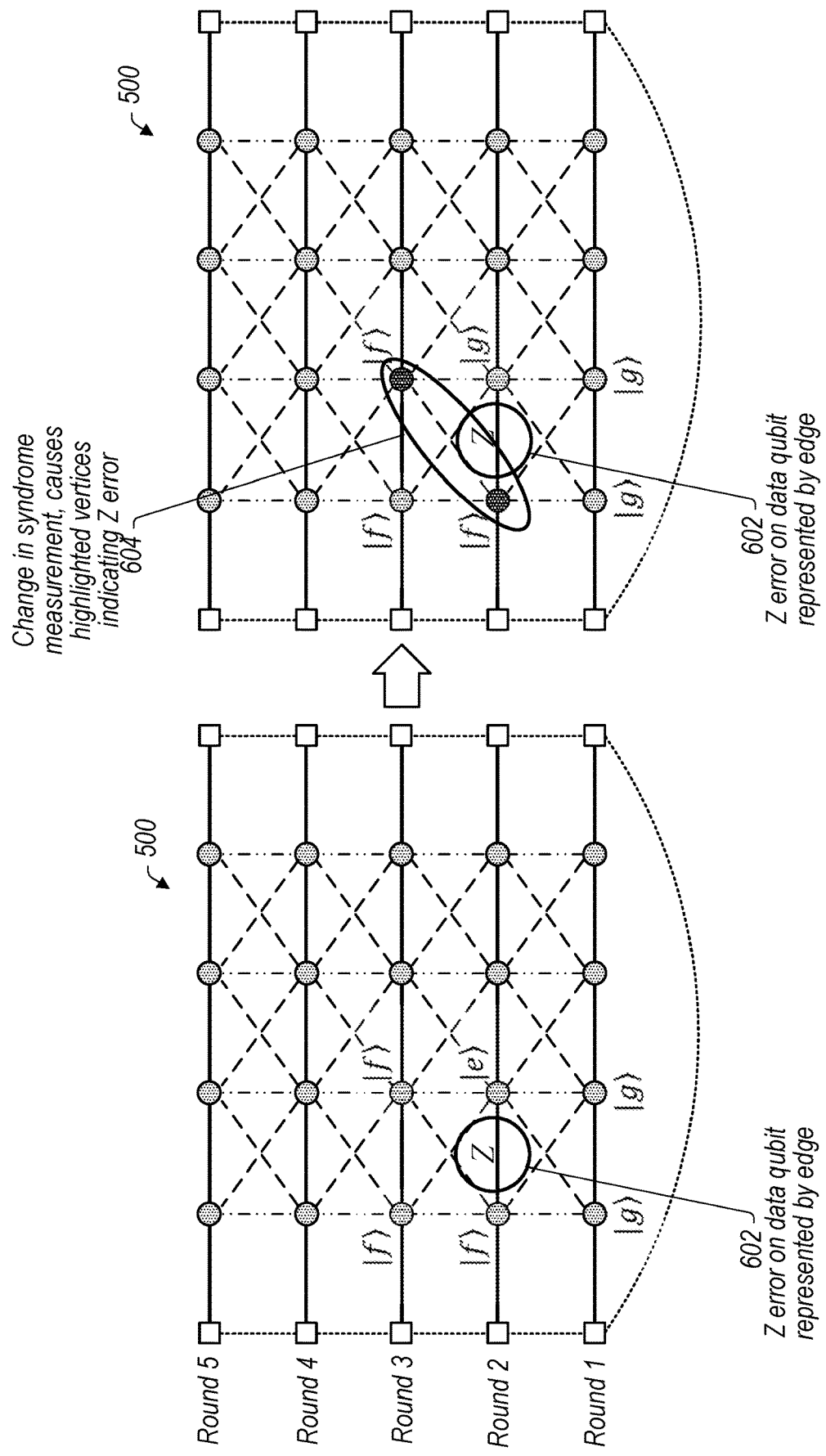
FIG. 6 illustrates exchange rules between states of the transmon qubits being used to highlight vertices of the minimum weight perfect matching (MWPM) graph to identify an error, according to some embodiments.

In some embodiments, the process shown in FIG. 3 is repeated for multiple rounds of syndrome measurements and the results of the rounds of syndrome measurements are interpreted using a minimum weight perfect matching (MWPM) graph as shown in FIGS. 5-6.

FIGS. 4A-4E illustrate time steps of a process for implementing a code comprising cat data qubits and transmon ancilla qubits, according to some embodiments. The time steps shown in FIGS. 4A-4E correspond to the steps shown in the process illustrated in FIG. 3. For illustration purposes, a distance 3 repetition code is shown in FIGS. 4A-4E. However, in some embodiments, the process shown in FIGS. 4A-4E may be applied to repetition codes having other distances, such as the distance 5 repetition code shown in FIG. 1.

Figure 4A:
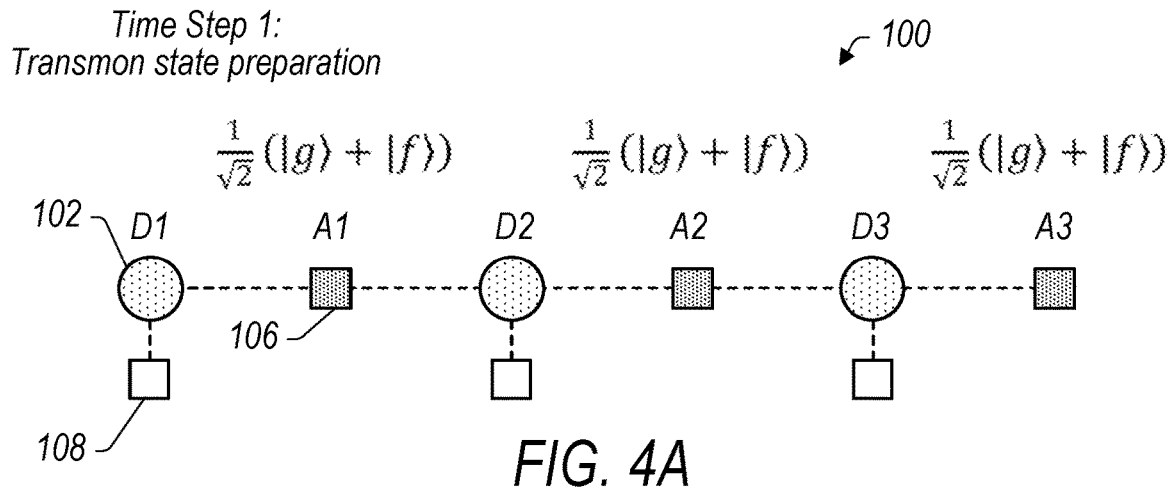
FIGS. 4A-4E illustrate time steps of a process for implementing a code comprising cat data qubits and transmon ancilla qubits, according to some embodiments.

In FIG. 4A the respective transmon ancilla qubits A1, A2, and A3 are implemented in the $$\frac{1}{\sqrt{2}}(|g\rangle + |f\rangle)$$

state. In some embodiments, the cat data qubits D1, D2, and D3 may be stabilized by buffer modes 108 during the process of implementing the transmon ancilla qubits 106 in the $$\frac{1}{\sqrt{2}}(|g\rangle + |f\rangle)$$

state. Also, in some embodiments, depending on bit-flip suppression strategy, the cat data qubits D1, D2, and D3 may not be stabilized during the process of implementing the transmon ancilla qubits 106 in the $$\frac{1}{\sqrt{2}}(|g\rangle + |f\rangle)$$

state. In some embodiments, for a d=3 repetition code as shown in FIGS. 4A-4E, the third transmon ancilla qubit, A3, may be omitted. In some embodiments, the process shown in FIG. 4A may take place during a first time step, e.g. time step 1.

Figure 4B:
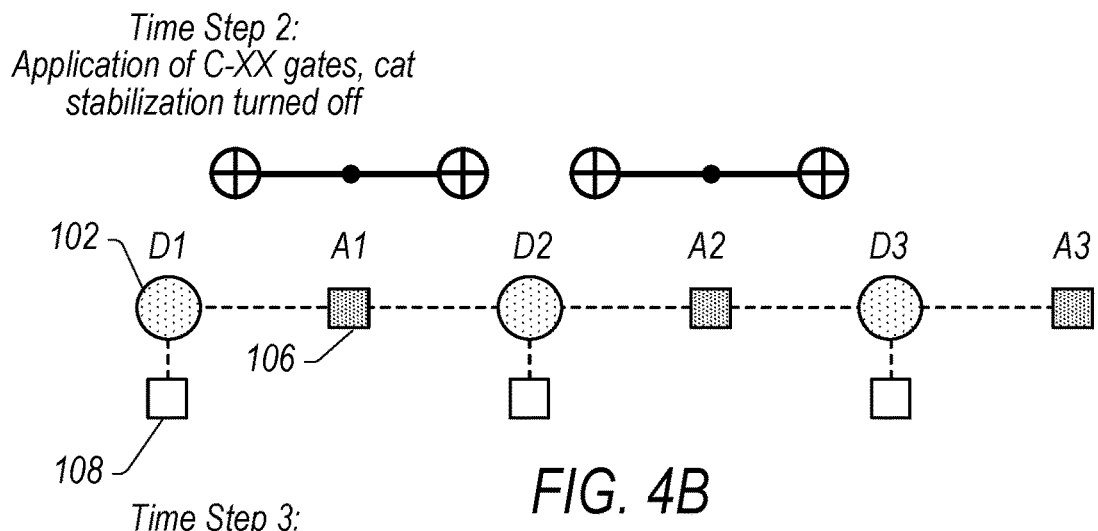

In FIG. 4B, gates, such as C-XX gates, are simultaneously applied such that a given cat data qubit, such as D2, interacts with multiple transmon ancilla qubits, such as A1 and A2 at the same time. In some embodiments, simultaneous C-XX gates are possible because the dispersive couplings commute with one another. The data qubits (e.g. D1, D2, and D3) are not stabilized during the process shown in FIG. 4B. In some embodiments, the process shown in FIG. 4B may take place during a second time step, e.g. time step 2.

Figure 4C:
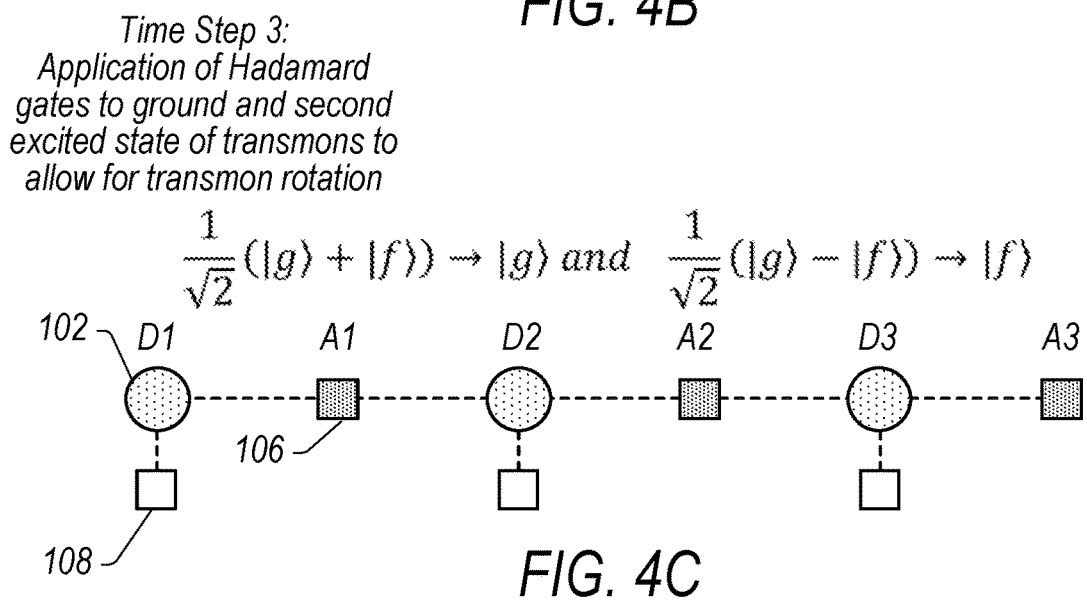

In FIG. 4C, Hadamard gates are applied to the transmon ancilla qubits in the g and f manifold (e.g. ground state manifold and second excited state manifold). The cat data qubits (e.g. D1, D2, and D3) may or may not be stabilized by buffer modes 108 depending on which bit-flip suppression technique is used. In some embodiments, the process shown in FIG. 4C may take place during a third time step, e.g. time step 3.

Figure 4D:
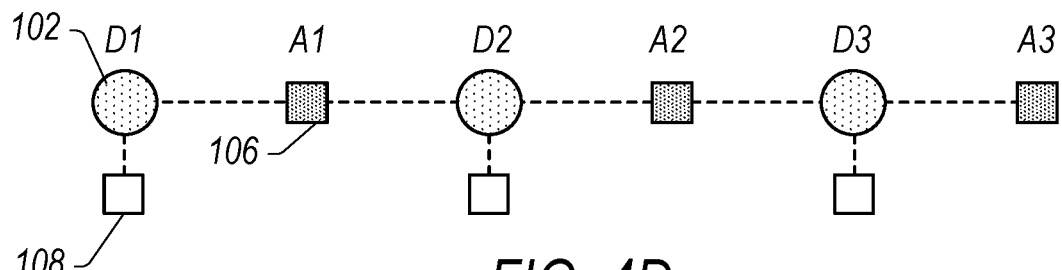

In FIG. 4D, all transmon ancilla qubits (e.g. A1, A2, and/or A3) are measured in the g, e, and f basis using readout resonators. Cat data qubits (e.g. D1, D2, and D3) may or may not be stabilized by buffer modes during this process depending on which bit-flip suppression technique is used. In some embodiments, the process shown in FIG. 4D may take place during a fourth time step, e.g. time step 4.

Figure 4E:
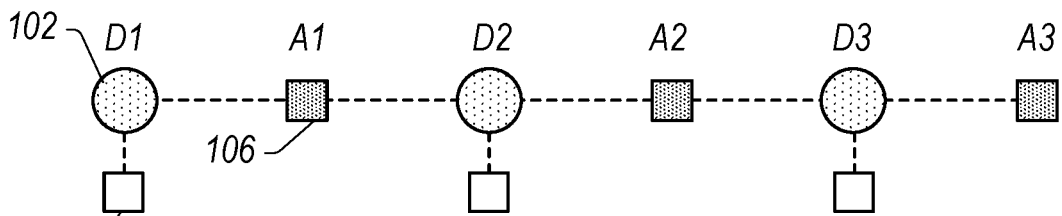

In FIG. 4E, the ancilla transmons (e.g. A1, A2, and/or A3) are reset to the ground state $|g\rangle$. The cat data qubits (e.g. D1, D2, and D3) are stabilized by the buffer modes 108 during this process. In some embodiments, the process shown in FIG. 4E may take place during a fifth time step, e.g. time step 5.

In some embodiments, the repetition cat logical states may be defined as:

$$|+\rangle_L = |+\rangle^{\otimes d}, |-\rangle_L = |-\rangle^{\otimes d}.$$

In the above equation, the subscript L denotes "logical", with the states $|+\rangle$ and $|-\rangle$ denoting the even and odd parity states. Also, d is the distance of the repetition-cat code. This basis convention is chosen for the logical qubits because using this basis errors at the physical level cause the same type of error at the logical level—phase flips in the cat qubits cause logical phase flips, and bit flips in the cat qubits cause logical bit flips.

FIG. 5 illustrates an example minimum weight perfect matching (MWPM) graph for syndrome measurements of a repetition code, such as shown in FIG. 1, according to some embodiments.

In some embodiments, phase-flip errors are corrected using a MWPM decoder applied to a matching graph which encapsulates all details of the circuit used to measure the repetition code stabilizers. In FIG. 5, an example of a matching graph for the repetition code with five rounds of stabilizer measurements is shown. The grey vertices 502 in the matching graph have a direct mapping to each stabilizer, and are used to track changes in syndrome measurement outcomes between two consecutive syndrome measurement rounds. The vertices 504 represented by squares are boundary vertices that are connected by dashed edges which have zero weight. Data qubits of the repetition code are represented by a black horizontal edges 506 forming a 1D horizontal strip for a given syndrome measurement round. Stabilizer measurements are repeated in order to distinguish data qubit errors from measurement errors. As such, vertical edges 508 are added to the graph to detect measurement errors. Lastly, loss errors occurring during the implementation of a CXX gate result in two highlighted vertices in the matching graph. However, such highlighted vertices occur in two consecutive syndrome measure rounds (which can be distinguished from data qubit errors which results in two highlighted vertices occurring in the same syndrome measurement round). As such, diagonal (space-time correlated) edges 510 are added to the matching graph to treat such failure events as a leading order process. Such edges are shown in green in FIG. 5.

Errors which anti-commute with stabilizers will result in the corresponding ancilla qubits to be measured in the $|f\rangle$ state. However, the transmon qubits have many levels including $|g\rangle$, $|e\rangle$, and $|f\rangle$. So, the possibility of the transmon ancillas being measured in the $|e\rangle$ state must be allowed for. In order to ensure a fault-tolerant syndrome measurement protocol which can correct any error arising from at most (d−1)/2 faults, whenever an ancilla transmon $q_i$ is measured in the $|e\rangle$ state in the j'th syndrome measurement round, the label for the measurement outcome is replaced by the measurement outcome of $q_i$ in round j−1. If an ancilla is measured in $|e\rangle$ in the first syndrome measurement round, then by default the label is replaced by $|g\rangle$. An example for a repetition code is shown in FIG. 6.

FIG. 6 illustrates exchange rules between states of the transmon qubits being used to highlight vertices of the minimum weight perfect matching (MWPM) graph to identify an error, according to some embodiments.

In FIG. 6, a Z error 602 occurs at a cat data qubit and is identified via highlighted vertices 604. For example, FIG. 6 illustrates an example of exchange rules when an transmon ancilla qubit is measured in the $|e\rangle$ state. Here an error 602 occurs on a data qubit in the second syndrome measurement round. However, one of the ancilla qubits is measured in $|e\rangle$ instead of $|f\rangle$. When ancillas are measured in $|e\rangle$, the label is replaced with the label from the previous round (in this case $|g\rangle$) and thus the corresponding vertex in the matching graph will not be highlighted since no change in syndrome measurement outcomes are recorded. However in the third syndrome measurement round, since the error is still present, the ancilla will be measured in $|f\rangle$ (assuming no other measurement errors occur). Since a change in syndrome is recorded ($|g\rangle$ to $|f\rangle$), the ancilla is highlighted resulting in the pair of highlighted vertices 604 shown in the figure. In such a case, a space-time correlated edge (circled) will be highlighted after applying MWPM and the error will be correctly identified.

Suppressing Bit-Flip Errors During C-XX Gates Using Chi Matching (e.g., at Time Step 2)

FIG. 7 is a flowchart illustrating how chi matching may be applied to set dispersive coupling coefficients used when applying C-XX gates, according to some embodiments.

In some embodiments, chi matching is performed to set dispersive coupling coefficients to be used to extract error information, such as with regard to block 304 of FIG. 3. For example, at block 702 that is associated with block 304 of FIG. 3, chi matching is performed to set dispersive coupling coefficients between respective ones of the cat qubits on either side of the respective ones of the transmon qubits and the respective ones of the transmon qubits, wherein the dispersive coupling coefficients are set via the chi matching such that the respective ones of the cat qubits rotate in a same manner during the set of gates regardless as to whether a corresponding one of the transmon qubits remains in the second excited state (f) or has decayed to the first excited state (e).

While phase-flip errors can be detected by the stabilizer measurements as prescribed in a syndrome extraction sequence and corrected by using a minimum-weight perfect matching decoder, bit-flip errors cannot be detected by the syndrome extraction sequence shown. Hence, bit-flip errors may be independently suppressed at the physical level by using additional suppression techniques. Since stabilization, such as two-photon dissipation stabilization, Kerr-cat stabilization, etc., on the cat data qubits must be turned off during the C-XX gates, cat qubits are most vulnerable to bit-flip errors during the C-XX gates. Note that in some embodiments, various stabilization techniques may be used, such as Hamiltonian stabilization, dissipative stabilization, or a hybrid of the two. In particular, in a naive implementation without chi matching, a constant fraction (approximately more than 10%) of transmon single-decay events leads to bit-flip errors in the cat data qubits. However, to suppress such bit-flip mechanisms, C-XX gates with the $|g\rangle$ (ground state) and $|f\rangle$ (second excited state) levels are implemented using chi matching. In this case, the $|e\rangle$ state (first excited state) is used as a buffer state for detecting transmon single-decay errors. Through chi-matching, it is possible to ensure that the cat data qubits rotate the same way even if the transmon decays from the $|f\rangle$ state to the $|e\rangle$ state. Hence, chi matching allows the C-XX gate to be made robust against any transmon single-decay events (e.g., $|f\rangle \rightarrow |e\rangle$). However, a constant fraction (again approximately more than 10%) of transmon heating (e.g, $|g\rangle \rightarrow |e\rangle$)) and double-decay events (e.g., $|f\rangle \rightarrow |g\rangle$)) can still lead to bit-flip errors on the cat data qubits. However, such processes are higher order processes and happen much less frequently than transmon single decay events. See FIG. 8 for a visualization, wherein FIG. 8 illustrates a chi-matched C-XX gate, according to some embodiments.

Figure 8:
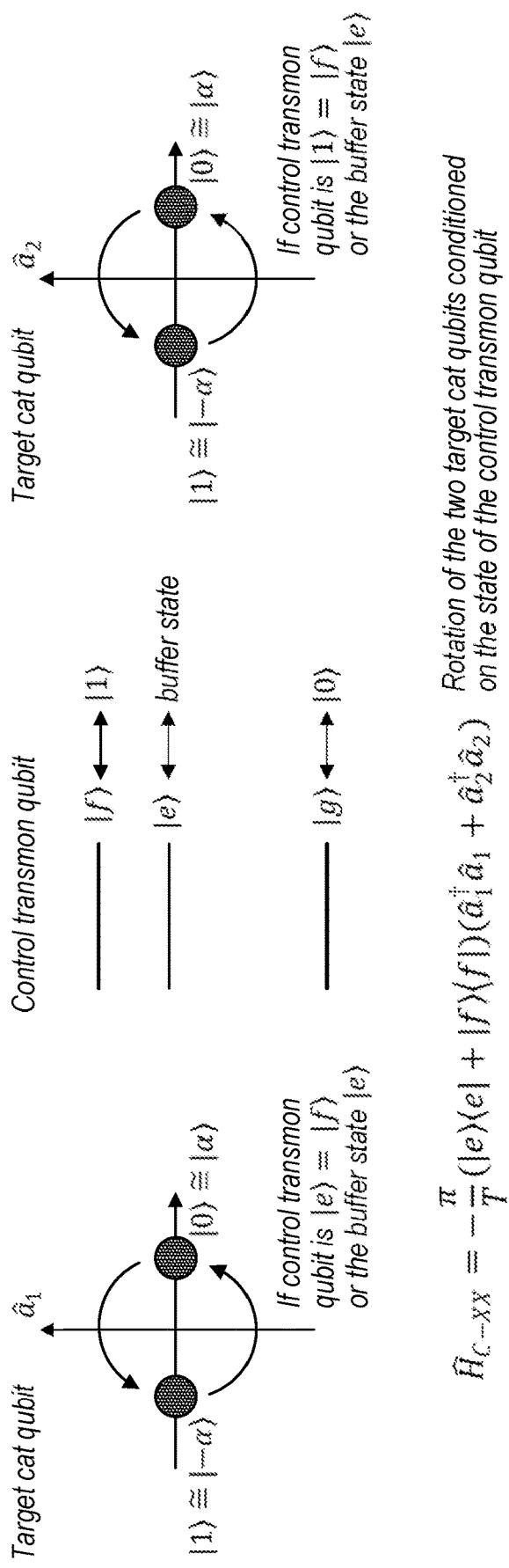
FIG. 8 illustrates a chi-matched C-XX gate, according to some embodiments.

For example, for a distance-3 repetition code as shown in FIGS. 4A-4E, to realize the C-XX gate, a chi matching as shown in FIG. 8 may be used. The chi matching used to set dispersive coupling the cat data qubits and the ancilla transmons is as follows, according to some embodiments:

$$\hat{H}_1 = \frac{\pi}{T}(\hat{a}_1^\dagger \hat{a}_1 + \hat{a}_2^\dagger \hat{a}_2)(|e_1\rangle\langle e_1| + |f_1\rangle\langle f_1|),$$

$$\hat{H}_2 = \frac{\pi}{T}(\hat{a}_2^\dagger \hat{a}_2 + \hat{a}_3^\dagger \hat{a}_3)(|e_2\rangle\langle e_2| + |f_2\rangle\langle f_2|),$$

Note that there may be many versions of chi matching used. As an example, the following may be used:

$$X_{ge}^{D1/A1} = X_{gf}^{D1/A1} = X_{ge}^{D2/A1} = X_{gf}^{D2/A1} = \frac{\pi}{T_{C-XX,1}}$$

for the first C-XX gate among D1, D2, and A1. This condition ensures that $|f_1\rangle \rightarrow |e_1\rangle$ decay in the first transmon does not lead to a bit-flip error on the cat data qubits. Note that slight mismatches in the chi's can be tolerated thanks to the cat qubit stabilization, such as via two-photon dissipation after the C-XX gates. Similarly for the second C-XX gate, the following may be used:

$$X_{ge}^{D2/A2} = X_{gf}^{D2/A2} = X_{ge}^{D3/A2} = X_{gf}^{D3/A2} = \frac{\pi}{T_{C-XX,2}}$$

which ensures that the $|f_2\rangle \rightarrow |e_2\rangle$ decay in the first transmon does not lead to a bit-flip error on the cat data qubits. Moreover, the following may be used:

$$T_{C-XX,1} = T_{C-XX,2}$$

such that all gates are completed at the same time and subsequent transmon operations (such as in time steps 3, 4, 5, and 1) are initiated simultaneously.

Suppressing Bit-Flip Errors During Transmon Readout and Reset (e.g. at Time Steps 4, 5)

In some embodiments various techniques or combinations of techniques may be used to suppress bit-flip errors during the transmon readout and reset. As discussed above, two-photon dissipation is turned off while the gates are being performed between the transmon ancilla qubit and the cat data qubits. During this time chi-matching is used, as described above, to suppress bit-flip errors. Also, at some point after performing the gates, such as during transmon read out and reset, the two-photon dissipation is turned back on. This allows for correction of over-rotation or under-rotation of the cat data qubits before moving on to the next syndrome extraction cycle.

A challenge faced when attempting to suppress bit-flip errors during transmon read out is that the strength of storage-transmon cross Kerr (e.g., dispersive coupling between a transmon and a cat qubit) is on the order of $2\pi \times 1$ MHz during the C-XX gates (e.g., time step 2). If this coupling strength is unchanged during the transmon readout and reset (e.g., time steps 4,5), the confinement rate due to the two-photon dissipation should generally be large enough to prevent any phase rotation in the cat data qubits due to storage transmon cross Kerr. However, currently the confinement rate is around $\kappa_2\alpha^2 \sim 2\pi \times 500$ MHz, which is not large enough to suppress the rotation due to storage-transmon cross Kerr. In other words, a desired condition $\kappa_2\alpha^2 \gg \chi$ cannot be satisfied in a simple experimental setup and this makes cat data qubits unprotected against bit-flip errors under general conditions.

In some embodiments, to address this issue, the dispersive coupling strength $\chi$ is decreased or the confinement rate $\kappa_2\alpha^2$ is increased, such that $\kappa_2\alpha^2 \gg \chi$. Also, in some embodiments, stroboscopic timing, as further explained below, is used to address this issue, such as when $\kappa_2\alpha^2 \gg \chi$ cannot be achieved.

Reducing Dispersive Coupling Via Transmon Frequency Tuning

In some embodiments, the storage-transmon cross Kerr is reduced by tuning transmons (e.g. transmon ancilla qubits) away from storage modes during the transmon readout and reset. For example, the storage-transmon cross Kerr may be reduced to, as an example, $2\pi \times (90\sim290)$ kHz from $2\pi \times 1$ MHz. This allows for a confinement rate of around $\kappa_2\alpha^2 \sim 2\pi \times 500$ KHz.

Reducing Dispersive Coupling Via a Tunable Coupler

In some embodiments, a coupler may be used, such as a galvanic coupler, such that the storage-transmon cross-Kerr can be turned on (e.g., at time step 2) and turned off (e.g., at time steps 1,3,4,5). This may be done at will by changing the coupler configuration (e.g., external flux of a coupler in the case of galvanic coupler). In some embodiments, various other types of tunable couplers may be used such as inductive couplers or capacitance-based couplers.

Increasing Two-Photon Dissipation Strength with Higher Buffer Impedance and Filtering In some embodiments, a strong dissipation may be used that increases the confinement rate by an order of magnitude (e.g. to $\kappa_2\alpha^2 \sim 2\pi \times 5$ MHz) while using fixed-frequency transmons and thus a fixed value of storage-transmon cross Kerr (e.g. $\sim 2\pi \times 1$ MHZ) throughout the entire error correction cycle. Ways to achieve larger confinement rate include, but are not limited to, using higher buffer impedance, coupling storage and buffer modes more strongly, and using multi-mode bandpass filter with a sharp filter spectrum.

While all three schemes discussed above differ in their detailed implementations, a common aspect shared in some embodiments, is to ensure $\chi \ll \kappa_2\alpha^2$ during transmon readout and reset (e.g. time steps 4,5), either by reducing $\chi$ (frequency tuning, tunable coupler) or increasing $\kappa_2\alpha^2$ (strong-dissipation). Since bit-flip errors are ideally suppressed throughout the entire transmon readout and reset, there is no constraint on the transmon readout and reset durations. Hence in these schemes, the read out and reset of transmon states may be performed as fast as desired.

Stroboscopic Scheme with One Transmon

In embodiments that use stroboscopic timing, it is not necessary to ensure $\chi \ll \kappa_2\alpha^2$ to suppress bit-flip errors. Instead, the two-photon dissipation is turned off during transom readout and the storage modes (e.g. cat data qubits) are allowed to freely rotate by a total rotation angle of $\pi \times$ integer regardless of the transmon state. In some embodiments, chi matching is turned off during the transmon readout such that the storage mode acquires $\pi \times$ integer phase regardless as to whether the transmon is in the $|e\rangle$ or $|f\rangle$ excited state. Moreover, in some embodiments, the readout time is approximately constrained to be an integer multiple of $\pi/X_{gf}$ which would be 500 ns if $\chi_{gf}/2\pi = 1$ MHz. Such stroboscopic timing works because the resulting simultaneous rotations by angle $\pi$ implement XX gates on cat data qubits which are stabilizers of the repetition-cat code, hence acting trivially on the code space.

Figure 9:
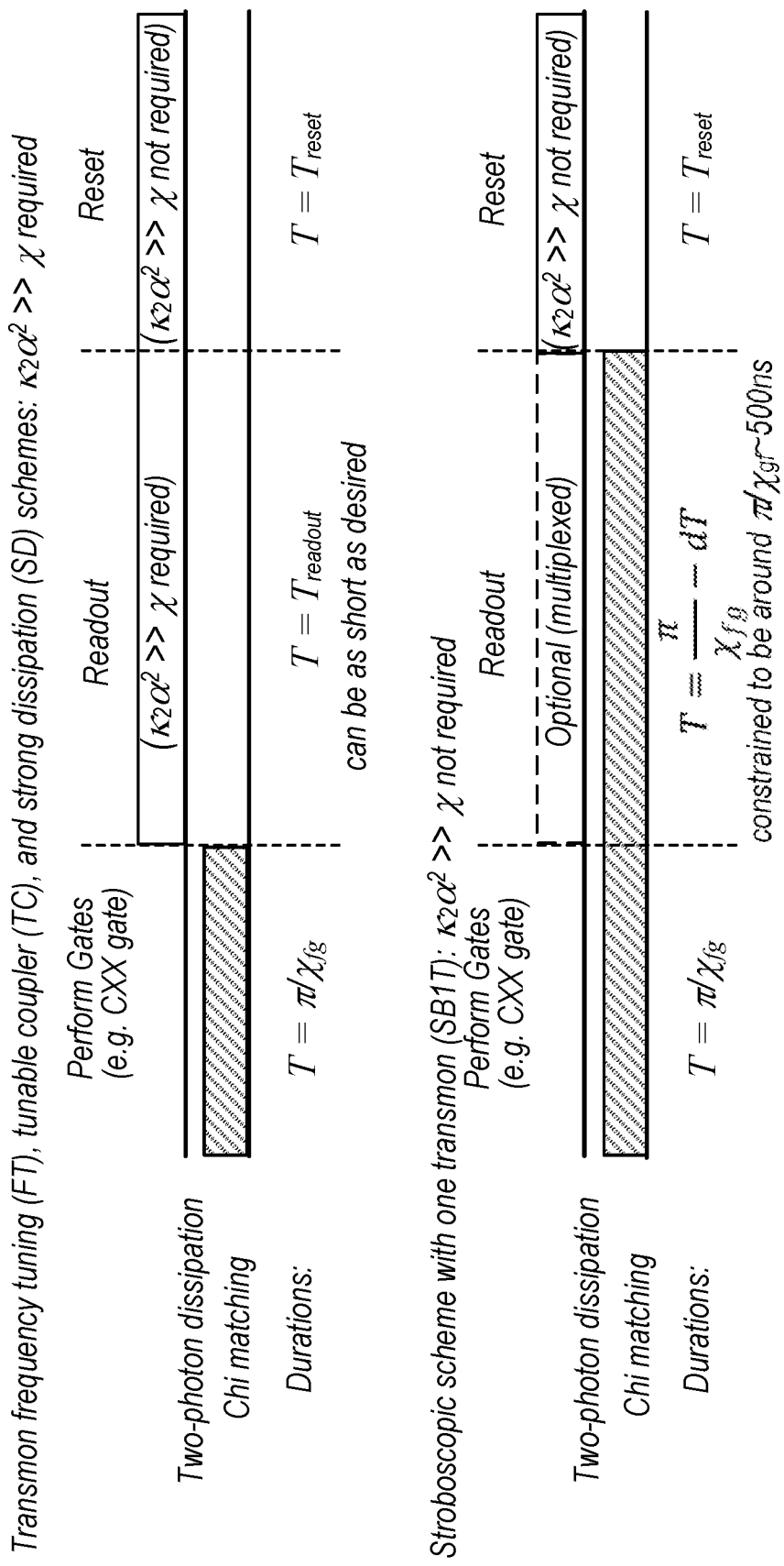
FIG. 9 illustrates control requirements of bit-flip suppression techniques, such as chi matching and one-transmon stroboscopic timing, according to some embodiments.

While, a case where the two-photon dissipation is turned off during transmon readout, optionally, multiplexed stabilization may be used to stabilize a cat data qubit in both the stationary and rotating frames. See FIG. 9 for a visual summary, wherein FIG. 9 illustrates control requirements of bit-flip suppression techniques, such as chi matching and one-transmon stroboscopic timing, according to some embodiments.

Stroboscopic Scheme with Two Transmons

Figure 10:
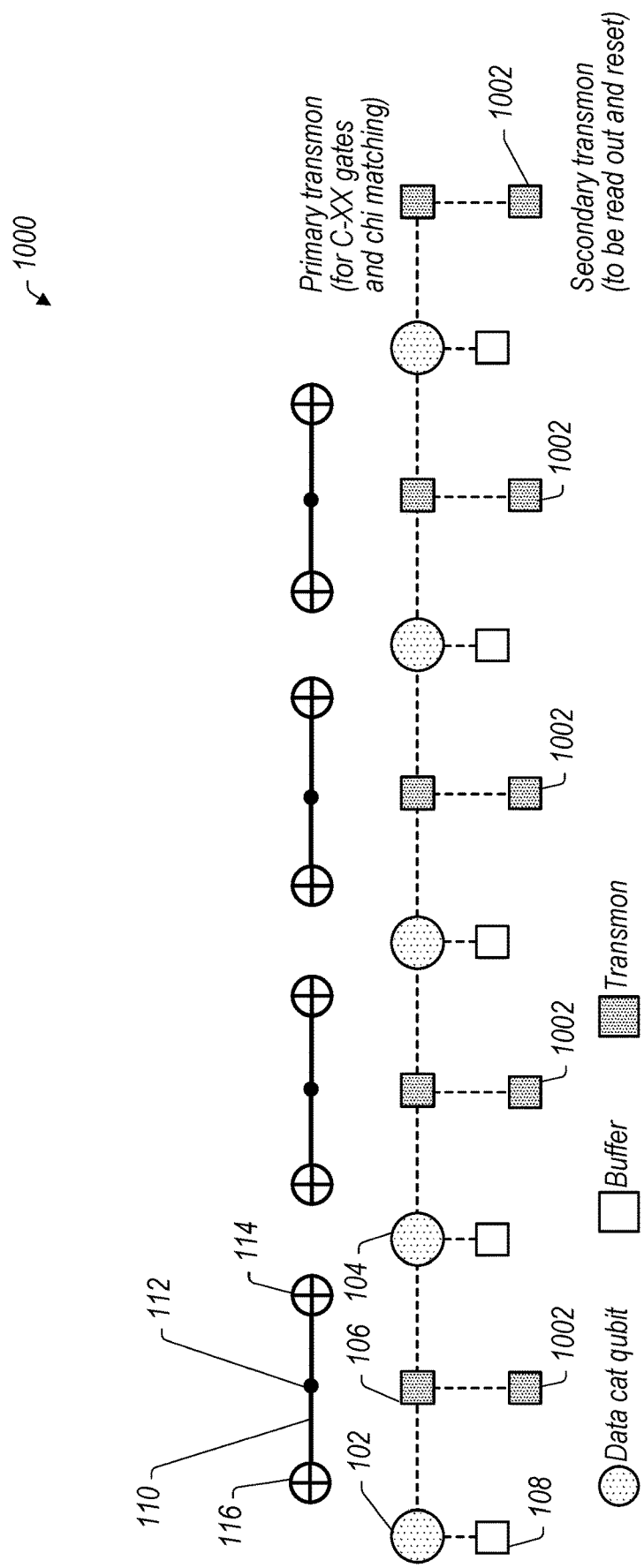
FIG. 10, illustrates an example repetition code as shown in FIG. 1 with additional readout transmon qubits coupled to the transmon ancilla qubits according to some embodiments.

A challenge involved in single-transmon stroboscopic scheme (which may be referred to as (SBIT)) is that chi matching and transmon readout are performed at the same time. Hence, chi matching is performed on a transmon which is subject to strong readout induced dephasing. One way to address this issue is to realize the stroboscopic scheme with two transmons, a primary transmon for C-XX gates and chi matching and a secondary transmon for readout and reset. See FIG. 10 for a visualization, wherein FIG. 10, illustrates an example repetition code as shown in FIG. 1 with additional readout transmon qubits coupled to the transmon ancilla qubits according to some embodiments. For example, repetition code 1000 additionally includes secondary transmons 1002.

Since two transmon ancillas are used per unit cell in this scheme, this scheme may be referred to as a two-transmon stroboscopic scheme (SB2T).

A key idea of the SB2T scheme is to swap the state of the primary transmon with a fresh ground state of the secondary transmon right after the C-XX gate. Thus, in the SB2T scheme, chi matching (primary transmon) and transmon readout (secondary transmon) are performed on different transmons. That is, unlike in the case of SB1T scheme, performance of chi matching is not degraded by readout-induced transmon dephasing in the SB2T scheme. Moreover, because a fresh ground state is swapped into the primary transmon after the C-XX gate, the primary transmon is mostly in its ground state during the readout and reset of the secondary transmon. However, there still can be a non-zero excited state population in the primary transmon after the SWAP due to heating and nonidealities of the secondary transmon reset and SWAP operations. Hence, it is still important to use a stroboscopic timing (i.e., an integer multiple of $\pi/\chi_{gf}$) for the transmon readout and reset durations such that the cat data qubits do not have bit-flip errors even in the presence of residual excited state population during the readout and reset stages. Note also that two-photon dissipation is turned on near the end of the readout and reset of the secondary transmon so cat data qubit states can be aligned in the correct axis before moving on to the next syndrome extraction round.

FIG. 11 illustrates control requirements of bit-flip suppression techniques, such as chi matching with one-transmon stroboscopic timing and with two-transmon stroboscopic timing, according to some embodiments.

Suppressing Bit-Flip Errors During Transmon Rotations (e.g., at Time Steps 1,3)

Ideally, transmon rotations for state preparation (time step 1) and the Hadamard gate (time step 3) are performed sufficiently fast so that any storage rotations during these steps are small regardless of which bit-flip suppression technique is used. However, the non-zero duration of these operations may need to be accounted for in some of the schemes.

In the transmon frequency tuning scheme (FT), one may perform these transmon rotations when the transmons are detuned away from the storage modes (which host data cat qubits). In this case, the strength of the storage-transmon cross Kerr (dispersive coupling) would be small and may be neglected. Alternatively, one may perform these transmon rotations when the transmons are close to the storage modes. In this case, the storage-transmon cross Kerr is large so the exact duration of the C-XX gate may need to be adjusted to account for the rotation of the storage modes during timesteps 1 and 3.

In the tunable coupler scheme (TC), the storage-transmon cross Kerr can be turned on and off at will so the storage-transmon cross Kerr can simply be turned off during time steps 1 and 3. Hence in the TC scheme, bit-flip errors on the data cat qubits are suppressed without any further mitigation techniques.

In the strong dissipation scheme (SD), two-photon dissipation is strong enough that the data cat qubits cannot rotate freely during transmon rotations in time steps 1 and 3. Thus in the SD scheme, bit-flip errors during time steps 1 and 3 can be suppressed by keeping the two-photon dissipation. However, it should be turned off before moving on to the C-XX gate (in time step 3).

In both stroboscopic schemes (SB1T and SB2T), since the storage-transmon cross Kerr remains constant throughout the entire syndrome extraction sequence, the storage rotations during time steps 1 and 3 may be non-negligible. Hence, the durations of the C-XX gates and transmon readout and reset should be adjusted to account for the storage rotations during time steps 1 and 3.

Applications Beyond the Repetition Code

In some embodiments, the use of transmon ancilla qubits may be extended to topological codes. For example, FIGS. 12-14 illustrate applications involving the surface code and lattice surgery.

Figure 12:
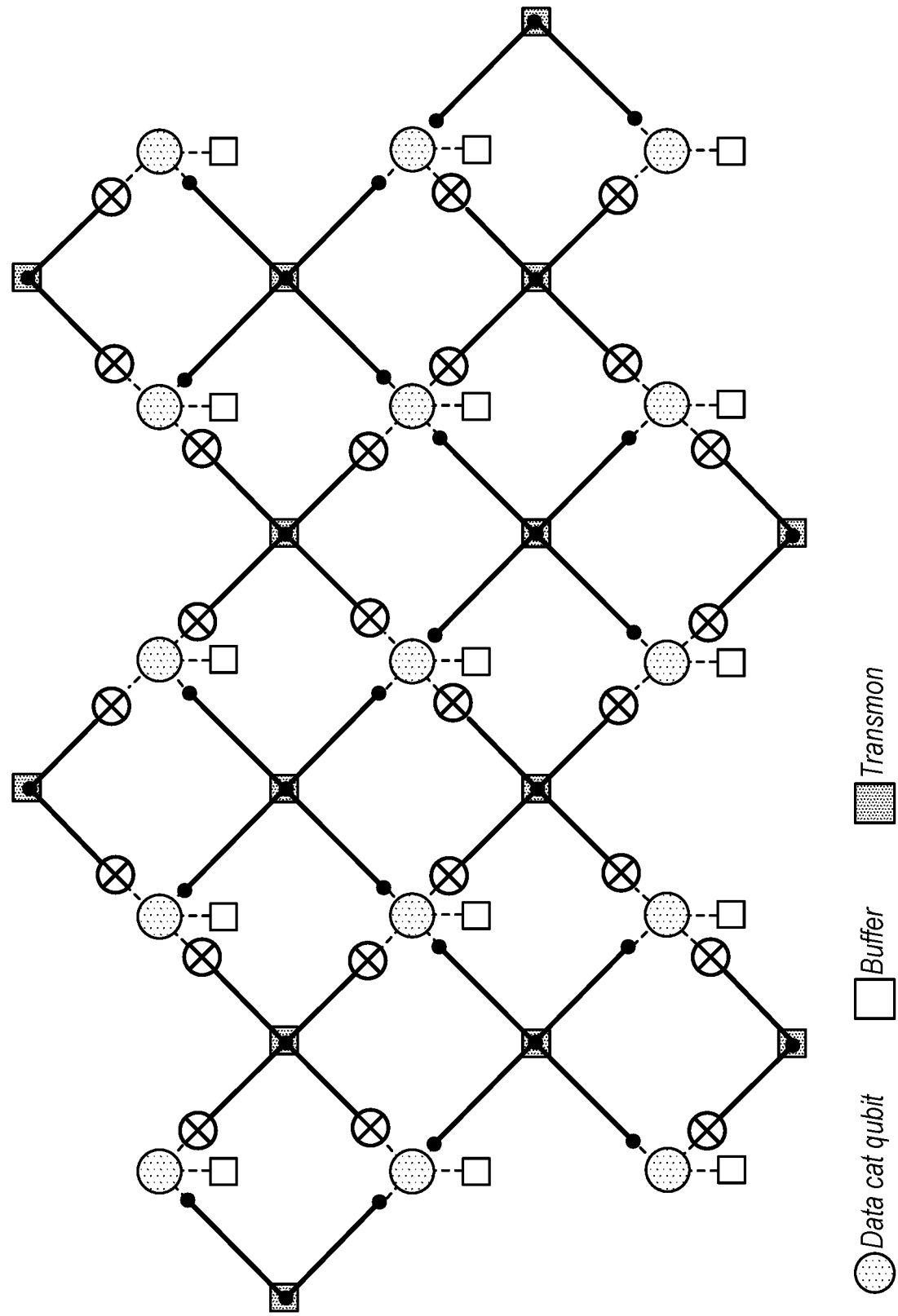
FIG. 12 illustrates an example surface code comprising cat data qubits and transmon ancilla qubits, according to some embodiments.

FIG. 12 illustrates an example surface code comprising cat data qubits and transmon ancilla qubits, according to some embodiments. For example, the surface code shown in FIG. 12 is a rotated surface code with transmon ancilla qubits with distances dz=5 and $d_x$=3.

Figure 13:
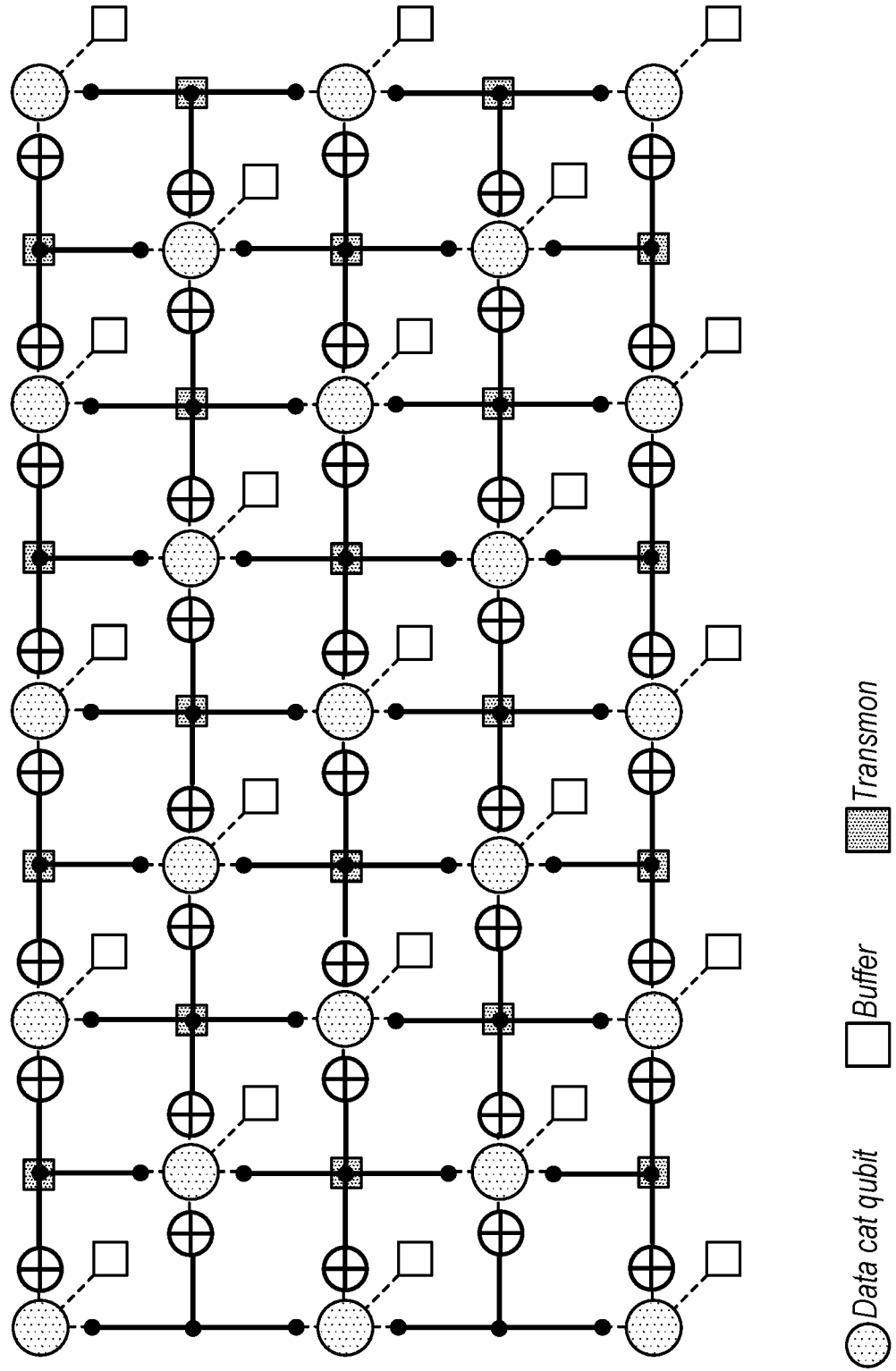
FIG. 13 illustrates another example surface code comprising cat data qubits and transmon ancilla qubits, according to some embodiments.

FIG. 13 illustrates another example surface code comprising cat data qubits and transmon ancilla qubits, according to some embodiments. For example, the surface code shown in FIG. 13 is a XZZX surface code with transmon ancilla qubits with distances $d_z$=5 and $d_x$=3.

Figure 14:
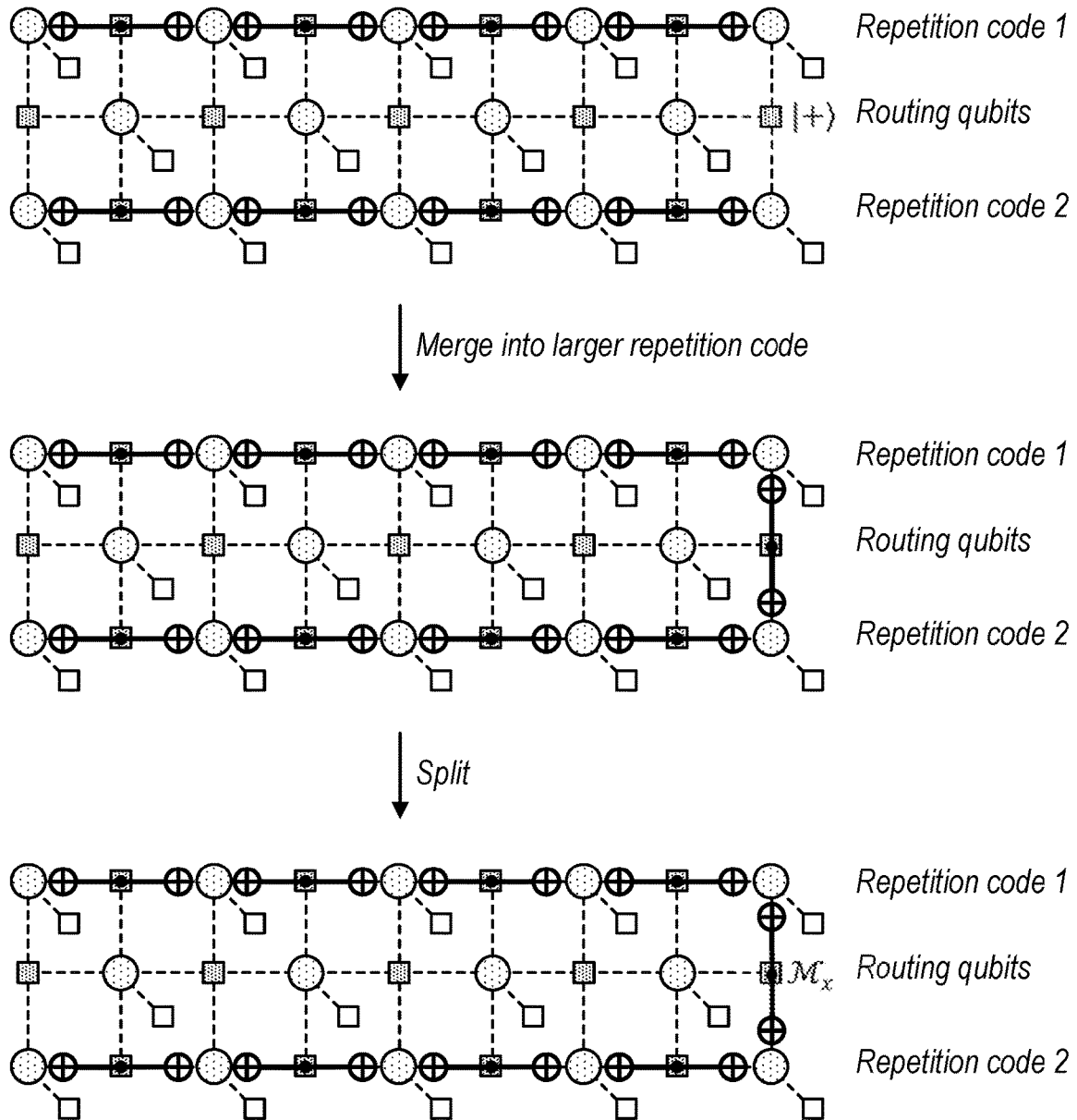
FIG. 14 illustrates lattice surgery operations performed between repetition codes, such as shown in FIG. 1, used to perform logical gates between logical information stored in the repetition codes, according to some embodiments.

In some embodiments, transmon ancilla qubits may be used in other topological codes, such as a Bacon Shor code, FIG. 14 illustrates lattice surgery operations performed between repetition codes, such as shown in FIG. 1, used to perform logical gates between logical information stored in the repetition codes, according to some embodiments. For example, the lattice surgery depicted in FIG. 14 may be used to measure logical X⊗X of two repetition cat codes. The two repetition codes are merged into a larger repetition code and then are split into two repetition codes.

FIG. 15 illustrates another example of lattice surgery operations performed between repetition codes, such as shown in FIG. 1, used to perform logical gates between logical information stored in the repetition codes, according to some embodiments. For example, the lattice surgery depicted in FIG. 15 may be used to measure logical Z⊗Z of two repetition cat codes. The two repetition codes are merged into an XZZX surface code with $d_x$=2 and then are split into two repetition codes.

FIGS. 16A-16D illustrate an alternative procedure for merging repetition codes to measure logical Z⊗Z of two repetition cat codes. In the embodiment shown in FIGS. 16A-16D the merging of the repetition codes results in a Bacon-Shor code. An advantage of this approach as compared to the approach illustrated in FIG. 15 is that during the merge, the $d_x$ distance is 3 instead of 2. As such, one can protect against a single bit-flip error during the lattice surgery protocol. In some situations, the lattice surgery operations may add a significant number of fault locations. Hence for experiments demonstrating a logical CNOT gate, it might be useful to have the extra bit-flip protection during the protocol.

Figure 16A:
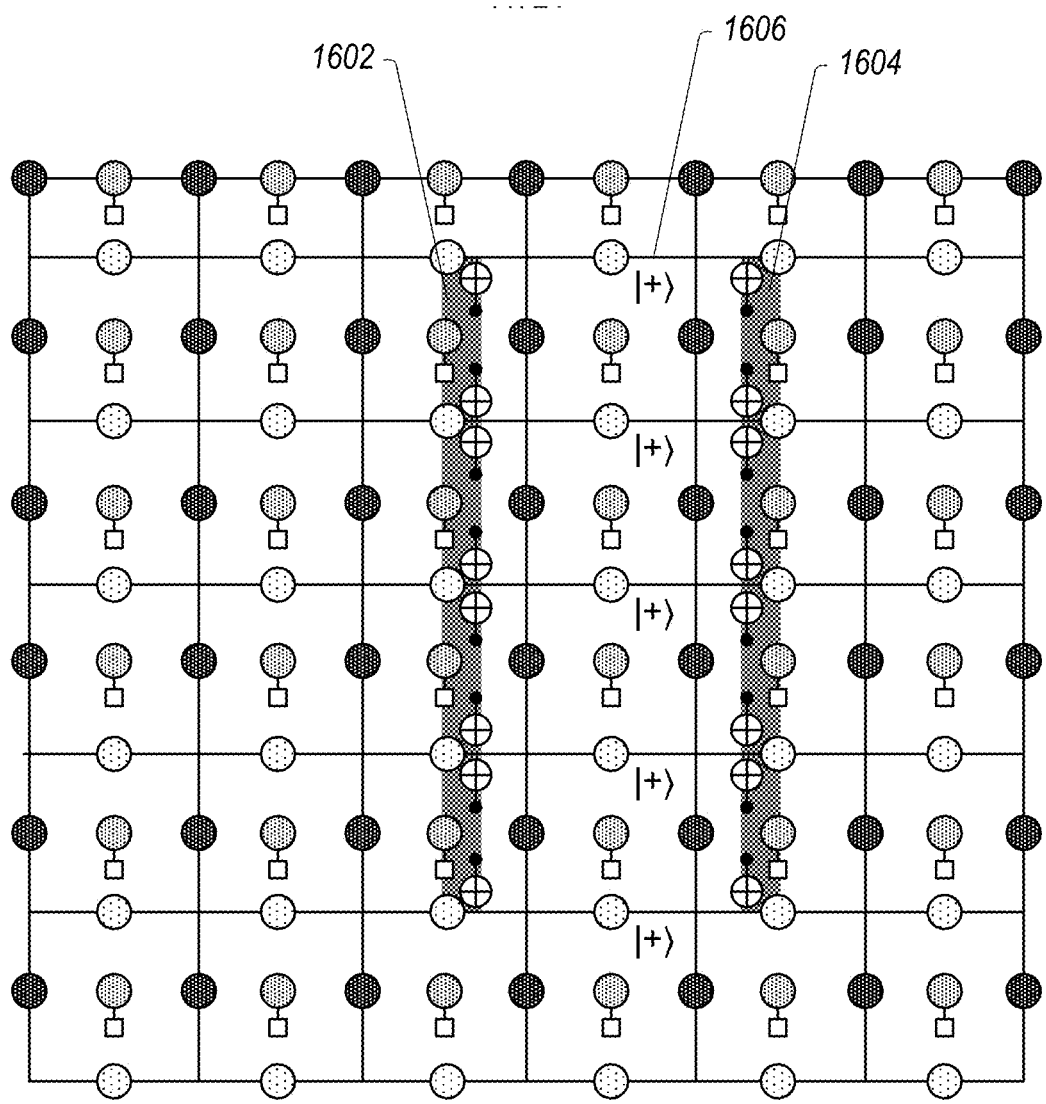
FIGS. 16A-16D illustrate another example of lattice surgery operations performed between repetition codes, such as shown in FIG. 1, used to perform logical gates between logical information stored in the repetition codes, according to some embodiments.

In FIG. 16A, two repetition code strips 1602 and 1604 are implemented with a third strip (1606) between the data blocks of the repetition code strips 1602 and 1604. The third strip (1606) comprises ancillas prepared in the |+⟩ state.

Figure 16B:
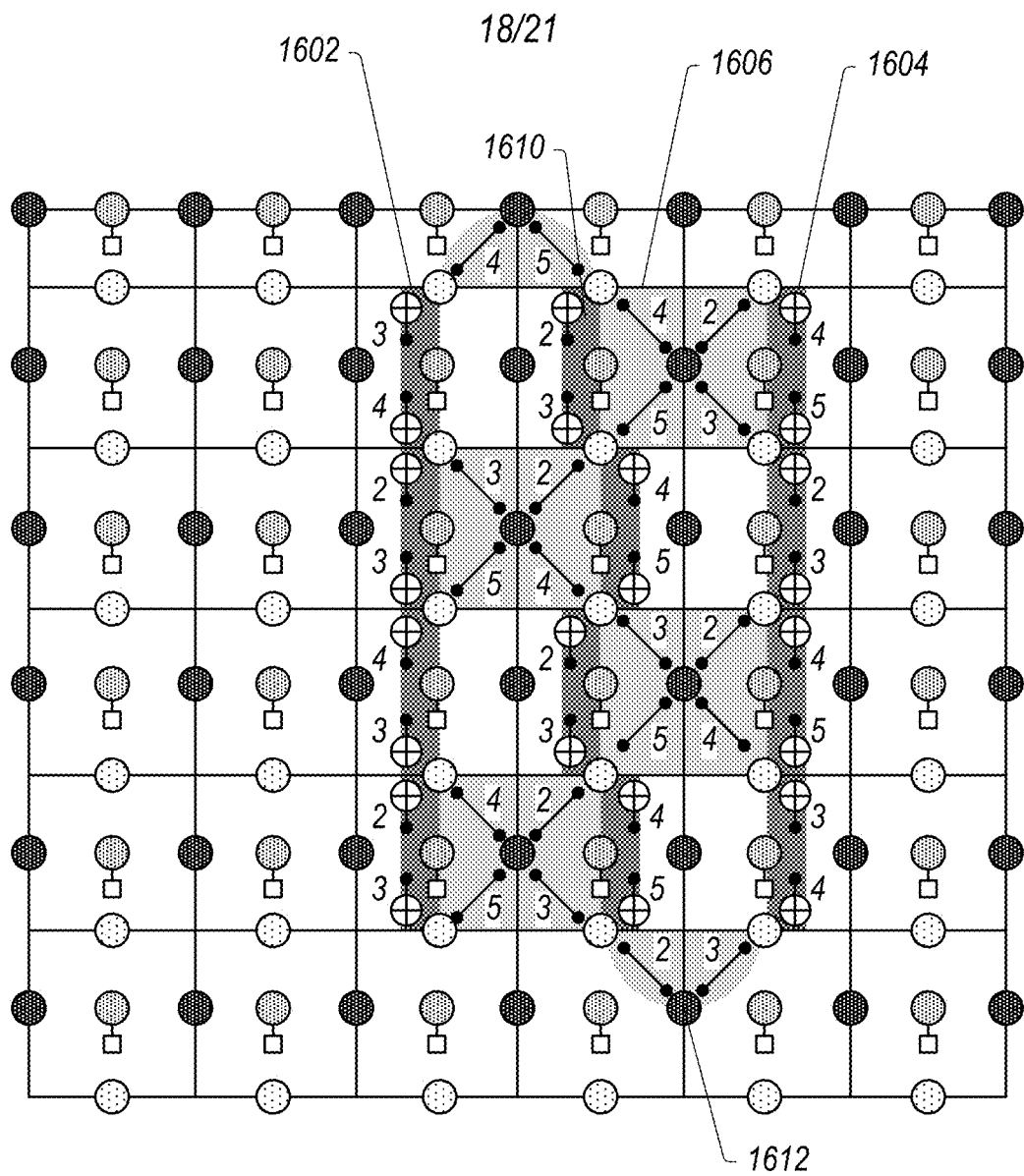

In FIG. 16B, the two repetition code strips 1602 and 1604 are merged with the ancilla strip 1606 by measuring the weight −4 Z checks (shown by light grey plaquettes 1608) and the checks (shown in dark grey 1610) on the ancilla patch 1606. Such an operation implements a logical Z⊗Z measurement, which can be used for implementing a logical CZ or CNOT gate. Unlike the XZZX surface code shown in FIG. 15, during the merge it is also possible to protect the code against single bit-flip errors. Note that the ancillas (dark grey vertices 1612) are measured in the X-basis.

Figure 16C:
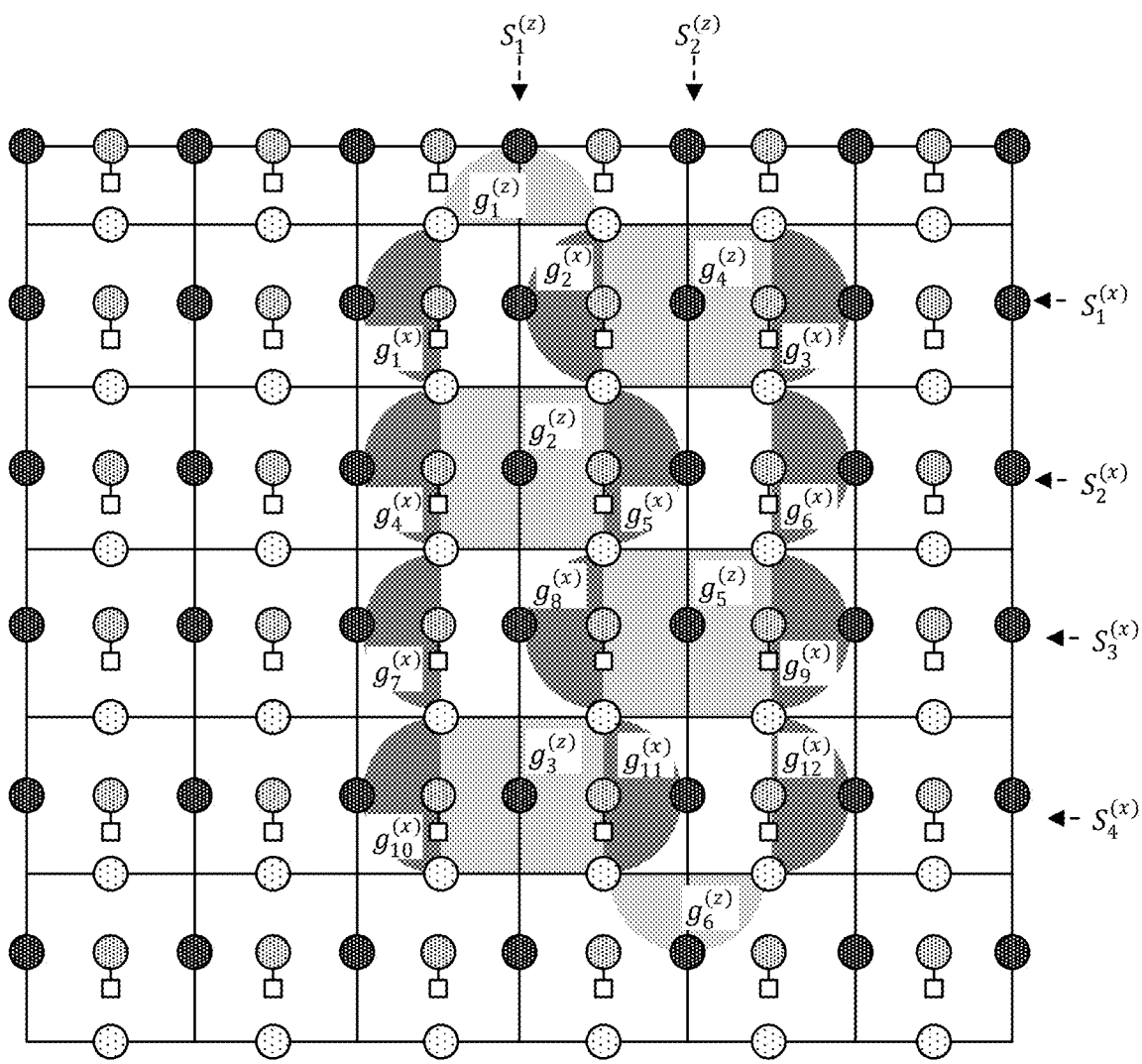

In FIG. 16C, the X and Z-type gauge operators (g) and stabilizers(s) of the Bacon-Shor code are shown for a $d_z$=5 Bacon-Shor code (e.g. prior to the merge the repetition code distance is 5). Where the Z-stabilizers are given by:

$$S_1^{(z)}=g_1^{(z)}g_2^{(z)}g_3^{(z)}$$

$$S_2^{(z)}=g_4^{(z)}g_5^{(z)}g_6^{(z)}$$

Also, the X-stabilizers are given by:

$$S_1^{(x)}=g_1^{(x)}g_2^{(x)}g_3^{(x)}$$

$$S_2^{(x)}=g_4^{(x)}g_5^{(x)}g_6^{(x)}$$

$$S_3^{(x)}=g_7^{(x)}g_8^{(x)}g_9^{(x)},$$

$$S_4^{(x)}=g_{10}^{(x)}g_{11}^{(x)}g_{12}^{(x)}$$

Figure 16D:
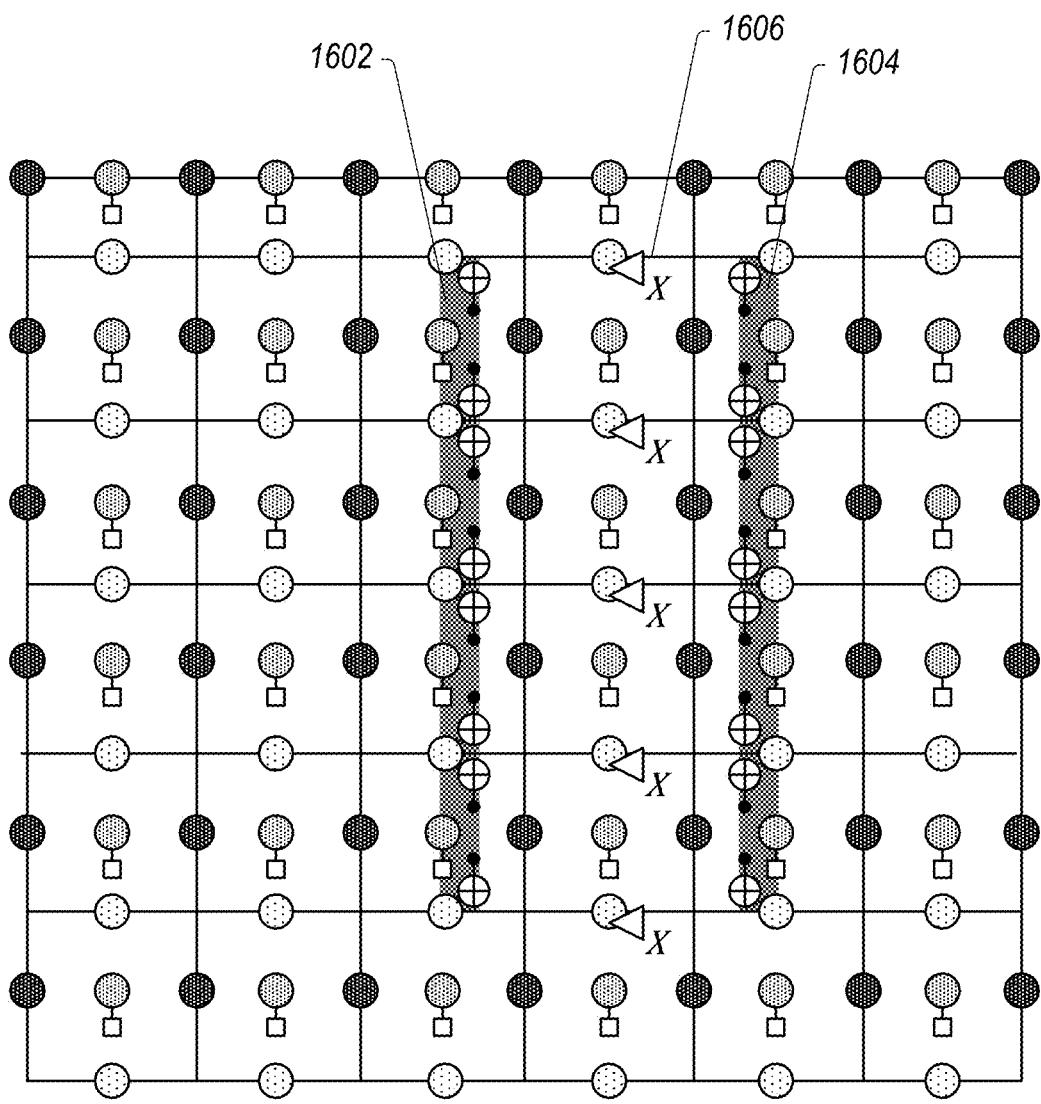

As mentioned above, in some embodiments, the logical $Z \otimes Z$ measurement may be used to implement a CZ gate. Thus, FIG. 16D illustrates an implementation of a logical CZ gate using repetition codes 1602 and 1604. In such an implementation, after preforming repeated rounds of error correction, the ancilla patch 1606 is measured in the X-basis to split the Bacon-Shor code back into repetition codes, which reverts the arrangement back to repetition code strips 1602 and 1604.

Illustrative Computer System

Figure 17:
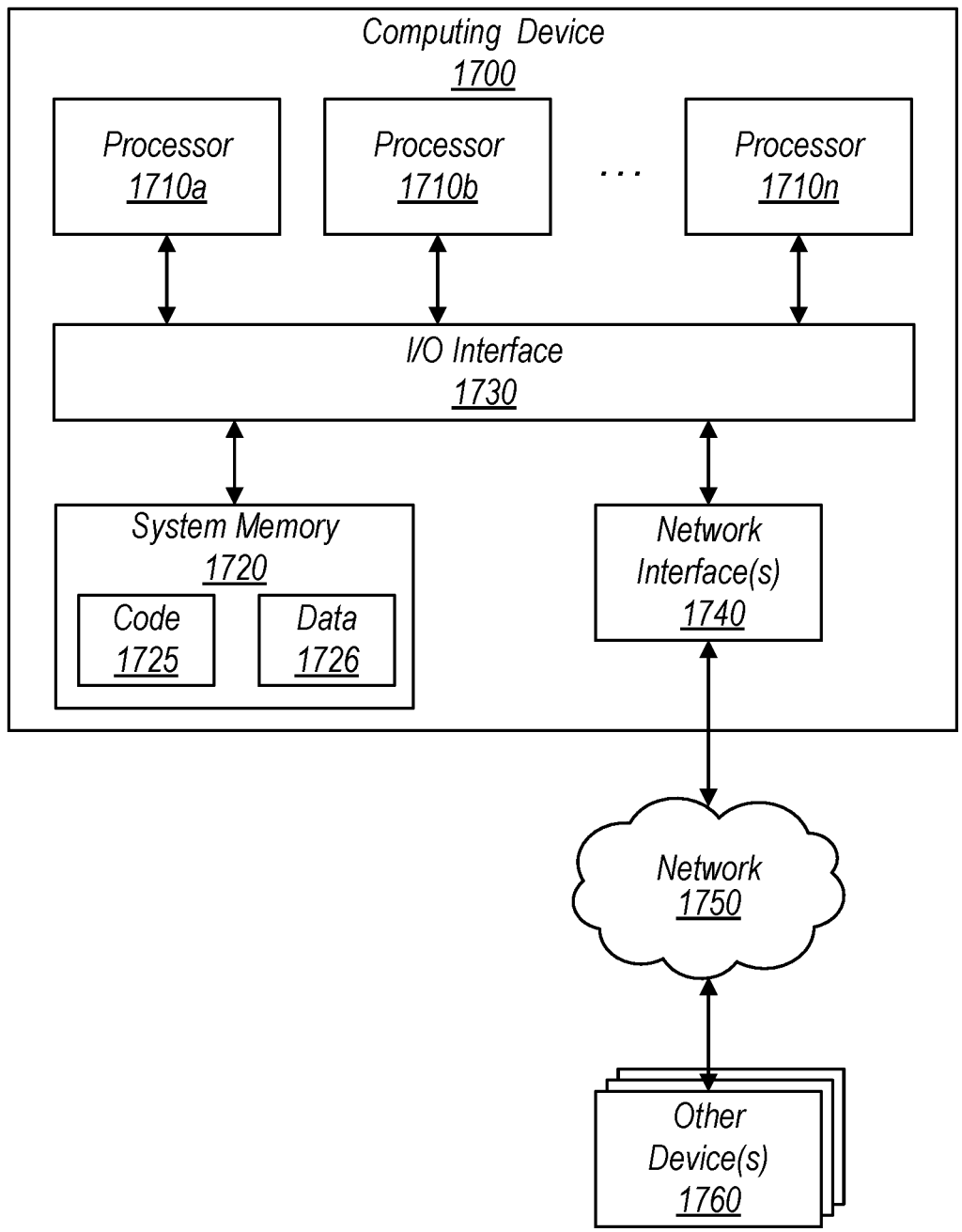
FIG. 17 is a block diagram illustrating an example computing device that may be used in at least some embodiments.

FIG. 17 is a block diagram illustrating an example computing device that may be used in at least some embodiments.

FIG. 17 illustrates such a general-purpose computing device 1700 as may be used in any of the embodiments described herein. In the illustrated embodiment, computing device 1700 includes one or more processors 1710 coupled to a system memory 1720 (which may comprise both non-volatile and volatile memory modules) via an input/output (I/O) interface 1730. Computing device 1700 further includes a network interface 1740 coupled to I/O interface 1730.

In various embodiments, computing device 1700 may be a uniprocessor system including one processor 1710, or a multiprocessor system including several processors 1710 (e.g., two, four, eight, or another suitable number). Processors 1710 may be any suitable processors capable of executing instructions. For example, in various embodiments, processors 1710 may be general-purpose or embedded processors implementing any of a variety of instruction set architectures (ISAs), such as the x86, PowerPC, SPARC, or MIPS ISAs, or any other suitable ISA. In multiprocessor systems, each of processors 1710 may commonly, but not necessarily, implement the same ISA. In some implementations, graphics processing units (GPUs) may be used instead of, or in addition to, conventional processors.

System memory 1720 may be configured to store instructions and data accessible by processor(s) 1710. In at least some embodiments, the system memory 1720 may comprise both volatile and non-volatile portions; in other embodiments, only volatile memory may be used. In various embodiments, the volatile portion of system memory 1720 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1720 as code 1725 and data 1726.

In some embodiments, I/O interface 1730 may be configured to coordinate I/O traffic between processor 1710, system memory 1720, and any peripheral devices in the device, including network interface 1740 or other peripheral interfaces such as various types of persistent and/or volatile storage devices. In some embodiments, I/O interface 1730 may perform any necessary protocol, timing or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, the function of I/O interface 1730 may be split into two or more separate components, such as a north bridge and a south bridge, for example. Also, in some embodiments some or all of the functionality of I/O interface 1730, such as an interface to system memory 1720, may be incorporated directly into processor 1710.

Network interface 1740 may be configured to allow data to be exchanged between computing device 1700 and other devices 1760 attached to a network or networks 1750, such as other computer systems or devices. In various embodiments, network interface 1740 may support communication via any suitable wired or wireless general data networks, such as types of Ethernet network, for example. Additionally, network interface 1740 may support communication via telecommunications/telephony networks such as analog voice networks or digital fiber communications networks, via storage area networks such as Fibre Channel SANs, or via any other suitable type of network and/or protocol.

In some embodiments, system memory 1720 may represent one embodiment of a computer-accessible medium configured to store at least a subset of program instructions and data used for implementing the methods and apparatus discussed in the context of FIG. 1 through FIG. 17. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1700 via I/O interface 1730. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 1700 as system memory 1720 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 1740. Portions or all of multiple computing devices such as that illustrated in FIG. 17 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a quantum device configured to:
   redundantly store logical information in a code, wherein the code comprises:
      data qubits that respectively store redundant instances of the logical information, wherein the data qubits are implemented using cat qubits; and
      ancilla qubits used to extract error information from the data qubits, wherein the ancilla qubits are implemented using transmon qubits; and
   set dispersive coupling coefficients such that respective ones of the cat qubits rotate in a same manner during a set of gates regardless as to whether a corresponding one of the transmon qubits remains in a second excited state (f) or has decayed to a first excited state (e).

2. The system of claim 1, further comprising a computing device storing program instructions that, when executed, cause the quantum device to implement the code, wherein to implement the code, the program instructions:
   cause the transmon qubits to be implemented on the quantum device in a $$\frac{1}{\sqrt{2}}(|g\rangle + |f\rangle)$$

state;
   cause error information to be extracted from the data qubits by applying a set of gates on respective sets of the cat qubits on either side of respective ones of the transmon qubits, wherein the respective ones of the transmon qubits act as control qubits for the gates with targets of the gates being the cat qubits on either side of the respective ones of the transmon qubits;
   apply Hadamard gates to the respective transmon qubits in a ground (g) and second excited state (f) manifold of the respective transmon qubits;
   read out the extracted error information and information indicating whether or not decay has occurred in the transmon qubits by measuring the transmon qubits in a ground state (g), a first excited state (e), and a second excited state (f) basis; and
   reset the transmon qubits to the ground state (g).

3. The system of claim 2, wherein the set of gates on the respective sets of cat qubits are C-XX gates applied during a same time step.

4. The system of claim 2, wherein the program instructions, when executed, further cause the computing device to:
   perform chi matching to set the dispersive coupling coefficients between respective ones of the cat qubits on either side of the respective ones of the transmon qubits and the respective ones of the transmon qubits, wherein the dispersive coupling coefficients are set via the chi matching such that the respective ones of the cat qubits rotate in a same manner during the set of gates regardless as to whether a corresponding one of the transmon qubits remains in the second excited state (f) or has decayed to the first excited state (e).

5. The system of claim 4, wherein the program instructions, when executed, further cause the computing device to:
   perform the chi matching during the read out; and
   apply stroboscopic timing to control rotations of the cat qubit that take place during the read out.

6. The system of claim 5, wherein the extracted error information is read out from the respective transmon qubits located between the cat qubits.

7. The system of claim 5, wherein the code comprises additional respective transmon qubits coupled to the respective transmon qubits between the cat qubits, and
   wherein to perform the read out, the program instruction, when executed, further cause:
      a state of the respective transmon qubits between the cat qubits to be swapped to one of the additional transmon qubits coupled to the respective transmon qubit between the cat qubits.

8. The system of claim 2, wherein the program instructions, when executed, further cause:
   stabilization of the cat qubits to be turned off while the sets of gates are applied to extract the error information.

9. The system of claim 8, wherein the program instructions, when executed, further cause:
   stabilization to be turned back on:
      during the read-out of the extracted error information, or
      during the reset of the transmon qubits.

10. The system of claim 9, wherein the program instructions, when executed, further cause the computing device to:
    tune frequencies of the transmon qubits during the read-out or reset, such that frequency modes of the transmon qubits are tuned away from storage mode frequencies of the cat qubits to reduce effects of storage-transmon cross Kerr effects.

11. The system of claim 9, wherein the program instructions, when executed, further cause:
    a tunable coupler to be applied to turn on a storage-transmon cross Kerr effect while applying the gates to extract the error information; and
    turn off, via the tunable coupler, the storage-transmon cross Ker effect during the read-out and re-set.

12. The system of claim 9, wherein a confinement rate of the cat qubits is greater than the dispersive coupling rate.

13. The system of claim 12, wherein the confinement rate of the cat qubits is increased via one or more of:
    an elevated buffer impedance of buffer qubits, wherein the buffer qubits are coupled to the cat qubits that function as data qubits;
    applying a strong coupling between a storage mode of the cat qubits and the buffer qubits; or
    applying a multi-mode bandpass filter to filter out the cross-Ker effect except for a pass range that allows the cross-Ker effect to pass while applying the gates to extract the error information.

14. The system of claim 1, wherein the code is a repetition code.

15. The system of claim 1, wherein the code is a surface code.

16. A method of implementing a code comprising data qubits implemented using cat qubits and ancilla qubits implemented using transmon qubits, the method comprising:
    implementing the transmon qubits in a $$\frac{1}{\sqrt{2}}(|g\rangle + |f\rangle)$$

state;
    extracting error information from the data qubits by applying a set of gates on respective sets of the cat qubits on either side of respective ones of the transmon qubits, wherein the respective ones of the transmon qubits act as control qubits for the gates with targets of the gates being the cat qubits on either side of the respective ones of the transmon qubits;
    applying Hadamard gates to the respective transmon qubits in a ground (g) and second excited state (f) manifold of the respective transmon qubits;
    reading out the extracted error information and information indicating whether or not decay has occurred in the transmon.

17. The method of claim 16, further comprising:
    performing chi matching to set dispersive coupling coefficients between respective ones of the cat qubits on either side of the respective ones of the transmon qubits and the respective ones of the transmon qubits, wherein the dispersive coupling coefficients are set via the chi matching such that the respective ones of the cat qubits rotate in a same manner during the set of gates regardless as to whether a corresponding one of the transmon qubits remains in the second excited state (f) or has decayed to the first excited state (e).

18. The method of claim 16, further comprising:
    turning off stabilization of the cat qubits off while the sets of gates are applied to extract the error information; and
    turning the stabilization back on:
        during the read-out of the extracted error information, or
        during the reset of the transmon qubits.

19. The method of claim 16, where the code is a first repetition code, the method further comprising:
    implementing a second repetition code comprising data qubits implemented using cat qubits and ancilla qubits implemented using transmon qubits; and
    performing a logical gate between the first repetition code and the second repetition code via lattice surgery.

20. A non-transitory, computer-readable medium storing program instructions, that when executed, cause a quantum device to implement a code comprising data qubits implemented using cat qubits and ancilla qubits implemented using transmon qubits, wherein to implement the code, the program instructions:
    cause the transmon qubits to be implemented on the quantum device in a $$\frac{1}{\sqrt{2}}(|g\rangle + |f\rangle)$$

state;
    cause error information to be extracted from the data qubits by applying a set of gates on respective sets of the cat qubits on either side of respective ones of the transmon qubits, wherein the respective ones of the transmon qubits act as control qubits for the gates with targets of the gates being the cat qubits on either side of the respective ones of the transmon qubits;
    apply Hadamard gates to the respective transmon qubits in a ground (g) and second excited state (f) manifold of the respective transmon qubits;
    read out the extracted error information and information indicating whether or not decay has occurred in the transmon qubits.

* * * * *